United States Patent [19]
Hyodo et al.

[11] Patent Number: 5,282,215
[45] Date of Patent: Jan. 25, 1994

[54] SYNCHRONIZATION CIRCUIT

[75] Inventors: Ryuji Hyodo; Tetsuo Nishino; Osamu Isono; Tetsuo Tachibana, all of Kawasaki; Naoyuki Miyamoto, Tama; Katsumi Oomuro; Tsuyoshi Yoneta, both of Kawasaki, all of Japan

[73] Assignee: Fujitsu Limited, Kawasaki, Japan

[21] Appl. No.: 672,863

[22] Filed: Mar. 20, 1991

[30] Foreign Application Priority Data

Mar. 20, 1990 [JP] Japan ........................... 2-68049

[51] Int. Cl.⁵ ........................................ G06F 11/10
[52] U.S. Cl. ........................... 371/42; 371/37.6; 371/37.7
[58] Field of Search ............... 371/37.6, 37.7, 38.1, 371/39.1, 42, 47.1

[56] References Cited

U.S. PATENT DOCUMENTS

| | | | |
|---|---|---|---|
| 3,336,467 | 8/1967 | Frey et al. | |
| 4,498,174 | 2/1985 | LeGresley | 371/37 |
| 4,593,393 | 6/1986 | Mead et al. | 371/37 |
| 5,103,451 | 4/1992 | Fossey | 371/37 |
| 5,132,975 | 7/1992 | Avaneas | 371/37 |

FOREIGN PATENT DOCUMENTS 0280914  9/1988  European Pat. Off. .

OTHER PUBLICATIONS

Hsing, D. P. et al., "On cell size and header error control of asynchronous transfer mode (ATM)", *IEEE Global Telecommunications Conference*, vol. 1, Nov. 28, 1988, pp. 394-402.
Ely, S. R. et al., "High-speed decoding technique for slip detection in data transmission systems using modified cyclic block codes", *Electronic Letters*, vol. 19, No. 3, Feb. 3, 1983, pp. 109-110.
European Search Report, The Hague, Nov. 20, 1992.

*Primary Examiner*—Vincent P. Canney
*Attorney, Agent, or Firm*—Staas & Halsey

[57] ABSTRACT

A synchronization circuit for ATM cells transferred in an ATM communication system, wherein the synchronization circuit receives and holds in a bit serial manner the input bit trains constituting the received ATM cells by a shift register unit, performs a CRC operation in a bit serial manner on the held input bit trains by a continuous CRC arithmetic unit in accordance with a simplified CRC operation process different from the usual CRC operation process, and performs the necessary synchronization control upon receiving the CRC arithmetic operation result at a synchronization control unit, thereby enabling CRC arithmetic operations to be performed continuously and by simple hardware on the headers in the ATM cells.

21 Claims, 42 Drawing Sheets

Fig. 22

| p | Monominal $E_p(x)$ (expression by bits) | Reminder $R(x)$ after division by polynominal generator (expression by bits) |
|---|---|---|
| $x^{39}$ | 10000000 00000000 00000000 00000000 00000000 | 00110001 |
| $x^{38}$ | 01000000 00000000 00000000 00000000 00000000 | 10011011 |
| $x^{37}$ | 00100000 00000000 00000000 00000000 00000000 | 11001110 |
| $x^{36}$ | 00010000 00000000 00000000 00000000 00000000 | 01100111 |
| $x^{35}$ | 00001000 00000000 00000000 00000000 00000000 | 10110000 |
| $x^{34}$ | 00000100 00000000 00000000 00000000 00000000 | 01011000 |
| $x^{33}$ | 00000010 00000000 00000000 00000000 00000000 | 00101100 |
| $x^{32}$ | 00000001 00000000 00000000 00000000 00000000 | 00010110 |
| $x^{31}$ | 00000000 10000000 00000000 00000000 00000000 | 00001011 |
| $x^{30}$ | 00000000 01000000 00000000 00000000 00000000 | 10000110 |
| $x^{29}$ | 00000000 00100000 00000000 00000000 00000000 | 01000011 |
| $x^{28}$ | 00000000 00010000 00000000 00000000 00000000 | 10100010 |
| $x^{27}$ | 00000000 00001000 00000000 00000000 00000000 | 01010001 |
| $x^{26}$ | 00000000 00000100 00000000 00000000 00000000 | 10101011 |
| $x^{25}$ | 00000000 00000010 00000000 00000000 00000000 | 11010110 |
| $x^{24}$ | 00000000 00000001 00000000 00000000 00000000 | 01101011 |
| $x^{23}$ | 00000000 00000000 10000000 00000000 00000000 | 10110110 |
| $x^{22}$ | 00000000 00000000 01000000 00000000 00000000 | 01011011 |
| $x^{21}$ | 00000000 00000000 00100000 00000000 00000000 | 10101110 |
| $x^{20}$ | 00000000 00000000 00010000 00000000 00000000 | 01010111 |
| $x^{19}$ | 00000000 00000000 00001000 00000000 00000000 | 10101000 |
| $x^{18}$ | 00000000 00000000 00000100 00000000 00000000 | 01010100 |
| $x^{17}$ | 00000000 00000000 00000010 00000000 00000000 | 00101010 |
| $x^{16}$ | 00000000 00000000 00000001 00000000 00000000 | 00010101 |
| $x^{15}$ | 00000000 00000000 00000000 10000000 00000000 | 10001001 |
| $x^{14}$ | 00000000 00000000 00000000 01000000 00000000 | 11000111 |
| $x^{13}$ | 00000000 00000000 00000000 00100000 00000000 | 11100000 |
| $x^{12}$ | 00000000 00000000 00000000 00010000 00000000 | 01110000 |
| $x^{11}$ | 00000000 00000000 00000000 00001000 00000000 | 00111000 |
| $x^{10}$ | 00000000 00000000 00000000 00000100 00000000 | 00011100 |
| $x^{09}$ | 00000000 00000000 00000000 00000010 00000000 | 00001110 |
| $x^{08}$ | 00000000 00000000 00000000 00000001 00000000 | 00000111 |
| $x^{07}$ | 00000000 00000000 00000000 00000000 10000000 | 10000000 |
| $x^{06}$ | 00000000 00000000 00000000 00000000 01000000 | 01000000 |
| $x^{05}$ | 00000000 00000000 00000000 00000000 00100000 | 00100000 |
| $x^{04}$ | 00000000 00000000 00000000 00000000 00010000 | 00010000 |
| $x^{03}$ | 00000000 00000000 00000000 00000000 00001000 | 00001000 |
| $x^{02}$ | 00000000 00000000 00000000 00000000 00000100 | 00000100 |
| $x^{01}$ | 00000000 00000000 00000000 00000000 00000010 | 00000010 |
| $x^{00}$ | 00000000 00000000 00000000 00000000 00000001 | 00000001 | j ⟶

Fig. 28

| INPUT | Do<br>RESULT BY CRC ARITHMETIC OPERATION |
|---|---|
| $x^7$ | 10000000 |
| $x^6$ | 01000000 |
| $x^5$ | 00100000 |
| $x^4$ | 00010000 |
| $x^3$ | 00001000 |
| $x^2$ | 00000100 |
| $x^1$ | 00000010 |
| $x^0$ | 00000001 |

| INPUT | RESULT BY CRC ARITHMETIC OPERATION |
|---|---|
| $x^{47}$ | 10010111 |
| $x^{46}$ | 11001000 |
| $x^{45}$ | 01100100 |
| $x^{44}$ | 00110010 |
| $x^{43}$ | 00011001 |
| $x^{42}$ | 10001111 |
| $x^{41}$ | 11000100 |
| $x^{40}$ | 01100010 |

| INPUT | RESULT BY CRC ARITHMETIC OPERATION |
|---|---|
| $x^{15}$ | 10001001 |
| $x^{14}$ | 11000111 |
| $x^{13}$ | 11100000 |
| $x^{12}$ | 01110000 |
| $x^{11}$ | 00111000 |
| $x^{10}$ | 00011100 |
| $x^{09}$ | 00001110 |
| $x^{08}$ | 00000111 |

| INPUT | RESULT BY CRC ARITHMETIC OPERATION |
|---|---|
| $\chi^{94}$ | 11010101 |
| $\chi^{93}$ | 11101001 |
| $\chi^{92}$ | 11110111 |
| $\chi^{91}$ | 11111000 |
| $\chi^{90}$ | 01111100 |
| $\chi^{89}$ | 00111110 |
| $\chi^{88}$ | 00011111 |
| $\chi^{87}$ | 10001100 |

Fig. 42

| INPUT | RESULT BY CRC ARITHMETIC OPERATION |
|---|---|
| $x^{15}$ | 10001001 |
| $x^{14}$ | 11000111 |
| $x^{13}$ | 11100000 |
| $x^{12}$ | 01110000 |
| $x^{11}$ | 00111000 |
| $x^{10}$ | 00011100 |
| $x^{11}$ | 00111000 |
| $x^{10}$ | 00011100 |
| $x^{11}$ | 00111000 |
| $x^{10}$ | 00011100 |
| $x^{09}$ | 00001110 |
| $x^{08}$ | 00000111 |

SYNCHRONIZATION CIRCUIT

BACKGROUND OF THE INVENTION

1. Field of the Invention

The present invention relates to a synchronization circuit, in particularly a synchronization circuit in an asynchronous transfer mode (ATM) communication system for synchronization of ATM cells connected on the lines in the system, that is, cell synchronization.

2. Description of the Related Art

At the present time, the Consultative Committee for International Telegraph and Telephone (CCITT) is proposing ATM communications suitable for broadband Integrated Services Digital Networks (ISDNs) etc., that is, data transfer by an asynchronous transfer mode, and is pressing forward with standardization of such systems. One proposal is for use of a full ATM for a layer.

If full ATM is used for a layer in accordance with that CCITT proposal, technology would become necessary for extracting each and every ATM cell which are units of data transfer by the ATM communications network. That is, it would be necessary to establish cell synchronization and detect the positions of the cells.

To extract cells in this way, cyclic redundancy check (CRC) arithmetic operations are said to be extremely effective. That is, a CRC arithmetic operation is performed on the header of a cell, the cells are detected when the results of the CRC arithmetic operation becomes fixed values, and cell synchronization is performed. In this case, even detection of errors of the cell header itself can naturally be performed by the inherent CRC function. Note that even when an error is included in a cell, cell synchronization can be sufficiently ensured by so-called front protection and rear protection.

Usually, ATM cells include the header and a payload for transmitting information. The header includes a field known as a header error control (HEC). The result of the CRC arithmetic operation are written into this HEC. The present invention relates to a synchronization circuit which writes, at the transmission side of the ATM cell, the result of the CRC arithmetic operation on the header in the HEC as a cell synchronization establishment signal and detects, at the reception side of the ATM cell, the coincidence of the results of the CRC arithmetic operation on the header of the received ATM cell and the result of the CRC arithmetic operation written at the transmission side in the HEC of the ATM cell so as to detect if cell synchronization has been achieved and to output a synchronization detection signal.

A detailed explanation will be made later of several conventional CRC arithmetic units referring to the attached figures. However, conventional CRC arithmetic units basically are constructed to receive input bits trains having definite time series, to perform CRC arithmetic operations on the bit trains, and to obtain a CRC arithmetic operation result.

On the other hand, in the ATM transmission art, a synchronization circuit of the full ATM transmission system does not cover such input bit trains having definite time series, but cover input bit trains having indefinite time series (ATM cell groups), so it is necessary to shift the input bit trains one bit at a time to continuously obtain CRC arithmetic operations results $C_{out}$.

If the conventional CRC arithmetic unit is assembled and designed to perform a CRC arithmetic operation on such input bit trains having indefinite time series (ATM cell groups), the assembled CRC arithmetic operation circuit would enlarge the size of the apparatus (hardware). Further, if the CRC arithmetic operation is performed on ultrahigh speed data, the problem will arise of an increased processing delay.

SUMMARY OF THE INVENTION

Therefore, the present invention, in view of the above-mentioned problems, has as its object the provision of a synchronization circuit provided with a CRC arithmetic unit which can obtain continuous CRC arithmetic operation results from input bit trains comprised of indefinite time series without increasing the processing delay and without increasing the size of the apparatus even in the case of ultrahigh speed data of several 100 Mb/s or more.

To attain the above object, the synchronization circuit of the present invention includes a shift register unit, a continuous CRC arithmetic unit, and a synchronization control unit. The shift register unit receives and holds in bit serial form the input bit trains comprising ATM cells used for data transfer. The continuous CRC arithmetic unit performs a CRC arithmetic operation in accordance with a simplified CRC arithmetic operation process. A conventional CRC arithmetic operation process is modified to reduce the number of operations. The synchronization control unit receives the result of the CRC arithmetic operation from the continuous CRC arithmetic unit. For transmission of ATM cells, the synchronization control unit inserts the CRC arithmetic operation result in the ATM cells as a synchronization establishment signal and sends the ATM cells, while on the reception side of the ATM cells, the synchronization control unit outputs a synchronization detection signal when the CRC arithmetic operation result stored in the ATM cells during transmission matches the CRC arithmetic operation result obtained by the operations of the continuous CRC arithmetic unit on the reception side.

BRIEF DESCRIPTION OF THE DRAWINGS

The above objects and features of the present invention will be more apparent from the following description of the preferred embodiments with reference to the accompanying drawings, wherein:

FIG. 22 is a view of the bit pattern for constituting the wired logic unit of FIG. 21;

FIG. 28 is a view of the bit pattern for constituting the portion corresponding to the bit output D0 in the wired logic unit of FIG. 27;

FIG. 29 is a view of the bit pattern for constituting the portion corresponding to the bit output D5 in the wired logic unit of FIG. 27;

FIG. 30 is a view of the bit pattern for constituting the portion corresponding to the immediate preceding CRC arithmetic operation result $C_{n-1}$ in the wired logic unit of FIG. 27;

FIG. 42 is a view of the bit pattern for constituting the Si arithmetic unit in FIG. 41;

DESCRIPTION OF THE PREFERRED EMBODIMENTS

Before describing the embodiments of the present invention, the related art and the disadvantages therein will be described with reference to the related figures.

Figure 1:
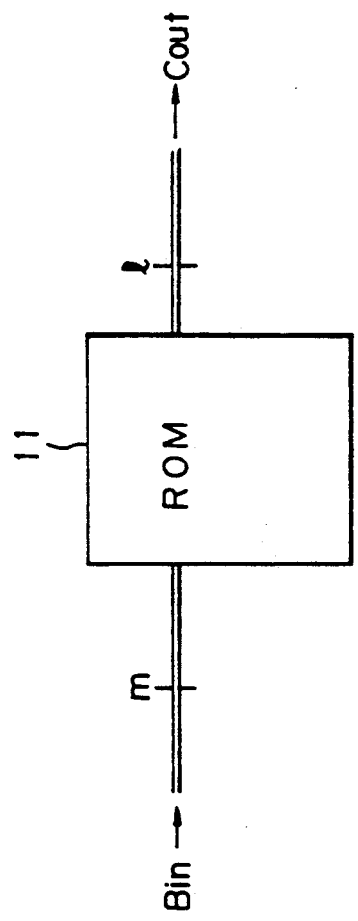
FIG. 1 is a block diagram of a first example of a conventional CRC arithmetic unit.

First, an explanation will be made of the conventional CRC arithmetic unit used for the previously mentioned CRC arithmetic operations. FIG. 1 is a block diagram of a first example of the conventional CRC arithmetic unit.

The first conventional example (FIG. 1) is of a type which reads out the CRC arithmetic operation results by a table and includes a ROM 11 storing the table, that is, a ROM table.

All CRC arithmetic operation results $C_{out}$ for input bit trains $B_{in}$ of m number of bits are stored in advance in the ROM table. The input bit trains $B_{in}$ are considered as addresses of the ROM 11 and the data read out is the CRC arithmetic operation result.

Figure 2:
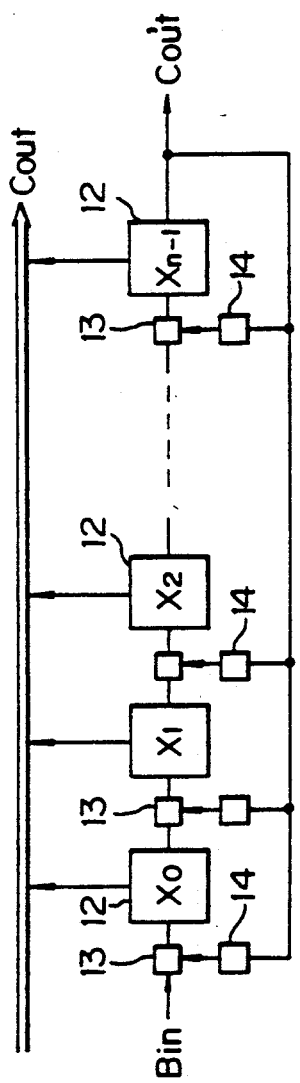
FIG. 2 is a block diagram of a second example of a conventional CRC arithmetic unit.

FIG. 2 is a block diagram of a second example of a conventional CRC arithmetic unit.

The second conventional example (FIG. 2) is of a so-called shift register type and includes serially connected shift registers 12 and exclusive OR gates (EX-OR) 13 inserted between the shift registers. The exclusive OR gates 13 have connectors 14 connected to them. The connectors 14 connect or do not connect (truth value set to "0") the CRC arithmetic operation results $C_{out}'$ in accordance with the coefficients of each order of the general polynomials used in the CRC arithmetic operation ("1" or "0"). Subtraction by the EX-OR 13 is not performed when the coefficient is "0".

Therefore, at the initial state, the values of all shift registers 12 are cleared to "0", then bit trains are successively input from the left side of the figure. The values of all shift registers 12 ($X_0, X_1 \ldots X_{n-1}$) when the final bit is input to the shift register 12 ($X_0$) at the left side show the CRC arithmetic operation result. Therefore, the values of $X_0$ to $X_{n-1}$ are read out at that point in time and the arranged value $C_{out}$ is the CRC operation result.

Figure 3:
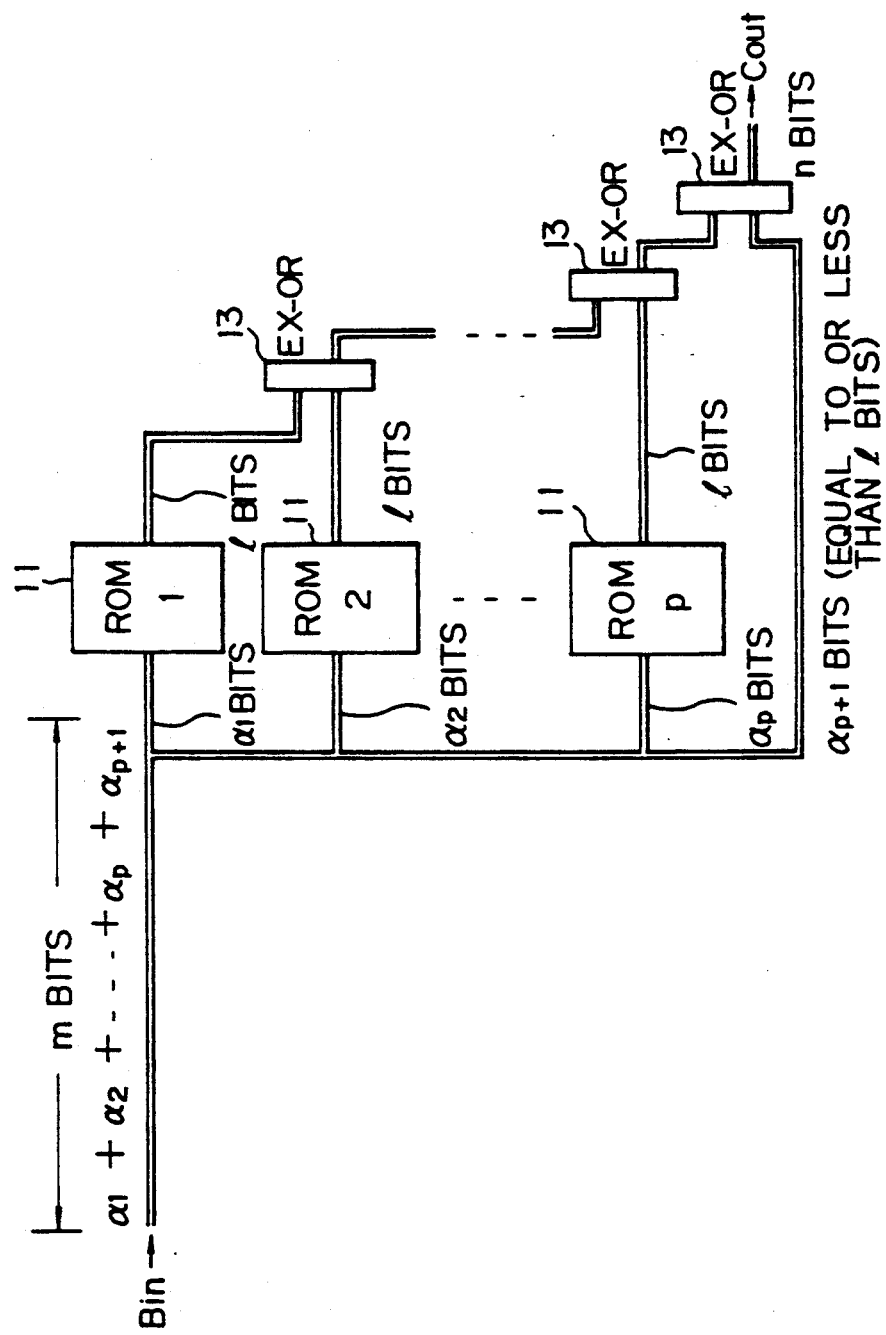
FIG. 3 is a block diagram of an example of an improvement of the first example of the conventional CRC unit.

FIG. 3 is a block diagram of an example of an improvement of the first example of the conventional CRC arithmetic unit.

The improved version of the first example of the conventional CRC arithmetic unit reads out the CRC arithmetic operation result from a plurality of ROM tables and uses a plurality of EX-OR logic gates, with a plurality of ROM's 11 and a plurality of exclusive OR gates (EX-OR) 13 being connected in parallel as illustrated. The contents of these ROM's 11 differ, however, so the ROM's are referred to as the ROM 1, ROM 2 .. . For example, the ROM 1 contains arithmetic operation results of "XXX ... X 000 ... 0" (XXX ... X being the $a1$ bit and 000 ... 0 being the $m-a_1$ bit), the ROM 2 contains the arithmetic operation results of "XXX ... X 0000" (XXX ... X being the $a_2$ bit and 000 ... 0 being the $m0a_1$-$a_2$ bit).

The input bit train $B_{in}$ of m number of bits is divided into suitable numbers of bits (shown by $a_1, a_2 ... a_p$, for example, each comprised of five bits). The CRC arithmetic operation result read out from the corresponding ROM 11 (each being of l number of bits) are input to the EX-OR's 13 as illustrated. The CRC arithmetic operation result $C_{out}$ is obtained from the final stage EX-OR 13. Note that when the number of bits of the remaining $a_{p+1}$ bits is smaller than the number of bits of the generator polynomial, $a_{p+1}$ is directly input to the final stage EX-OR 13 as the remainder.

According to this improved example, even if the number of bits m increases, the address space sought in the ROM 11 does not increase exponentially as in the first conventional example (FIG. 1). Further, compared with the above-mentioned second conventional example, since the CRC arithmetic operation processing is parallel processing, there is the advantage that a high speed is not required in the logic devices (ROM 1 and EX-OR 13).

The examples of the CRC arithmetic units given above are convenient for performing CRC arithmetic operations on segmented bit trains formed by dividing a continuous bit train into certain bit lengths. That is, they are suitable for CRC arithmetic operations on input bit trains having definite time series.

Figure 4:
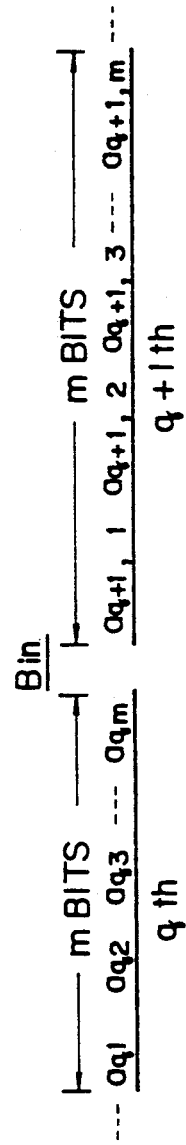
FIG. 4 is a view of an input bit train having a definite time series.

FIG. 4 is a view of an input bit train having a definite time series. In this figure, for example, a bit train $B_{in}$ divided into lengths of m bits is shown. It shows in particular the q-th segmented bit train and the q+1-st segmented bit train.

Figure 5:
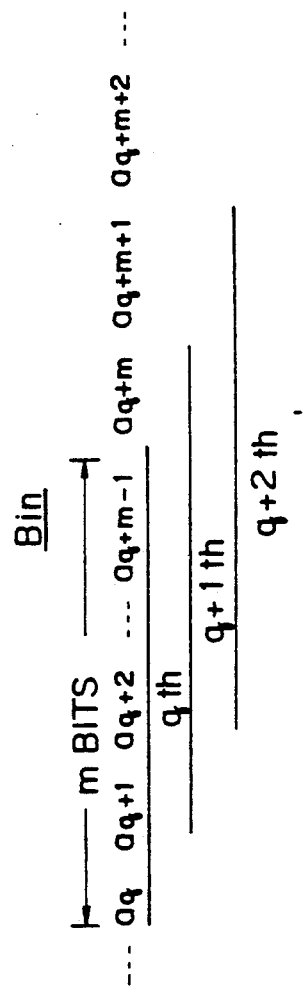
FIG. 5 is a view of an input train bit having an indefinite time series.

FIG. 5 is a view of an input bit train having an indefinite time series. The figure shows the state of shifting the object of the CRC arithmetic operation one bit at a time. That is, the extraction of a cell in the full ATM system mentioned above is performed by successively shifting the input bit train $B_{in}$ by a bit and executing a CRC arithmetic operation each time. The figure shows the input bit train $B_{in}$ covered by the q-th, q+1-st, and q+2-nd CRC arithmetic operations.

Figure 6:
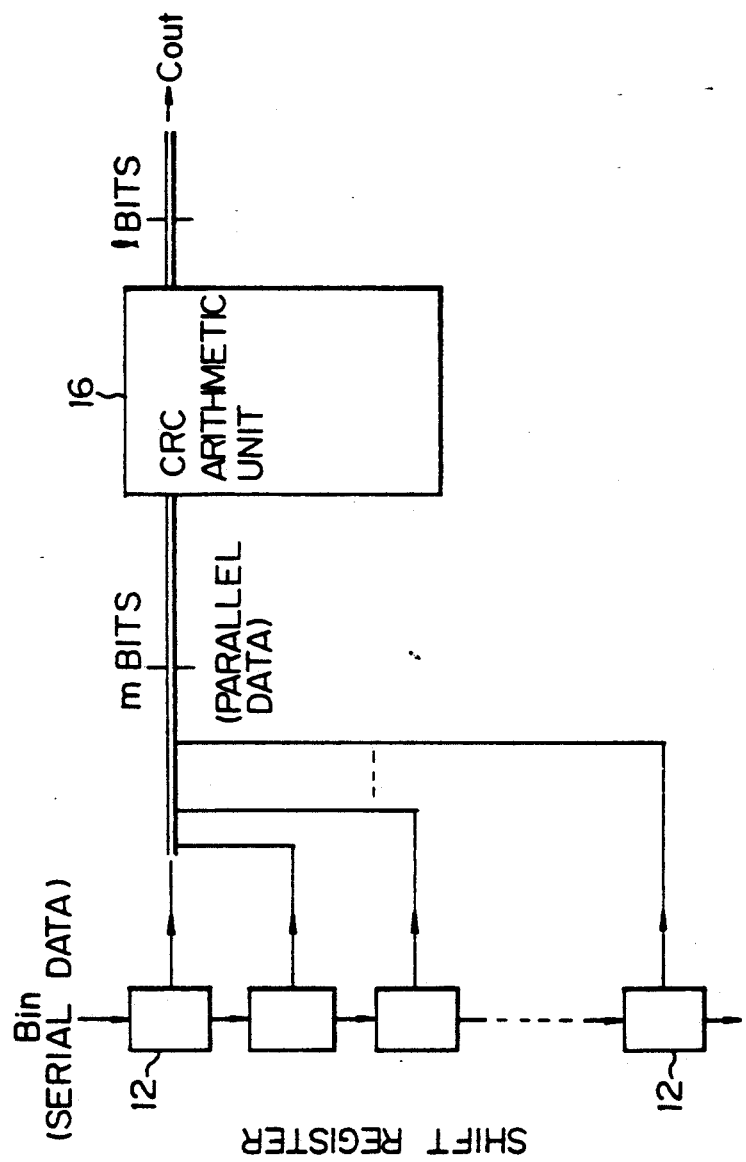
FIG. 6 is a block diagram of a first example of a synchronization circuit handling input bit trains having indefinite time series.

FIG. 6 is a block diagram of a first example of a synchronization circuit handling input bit trains having indefinite time series.

Figure 7:
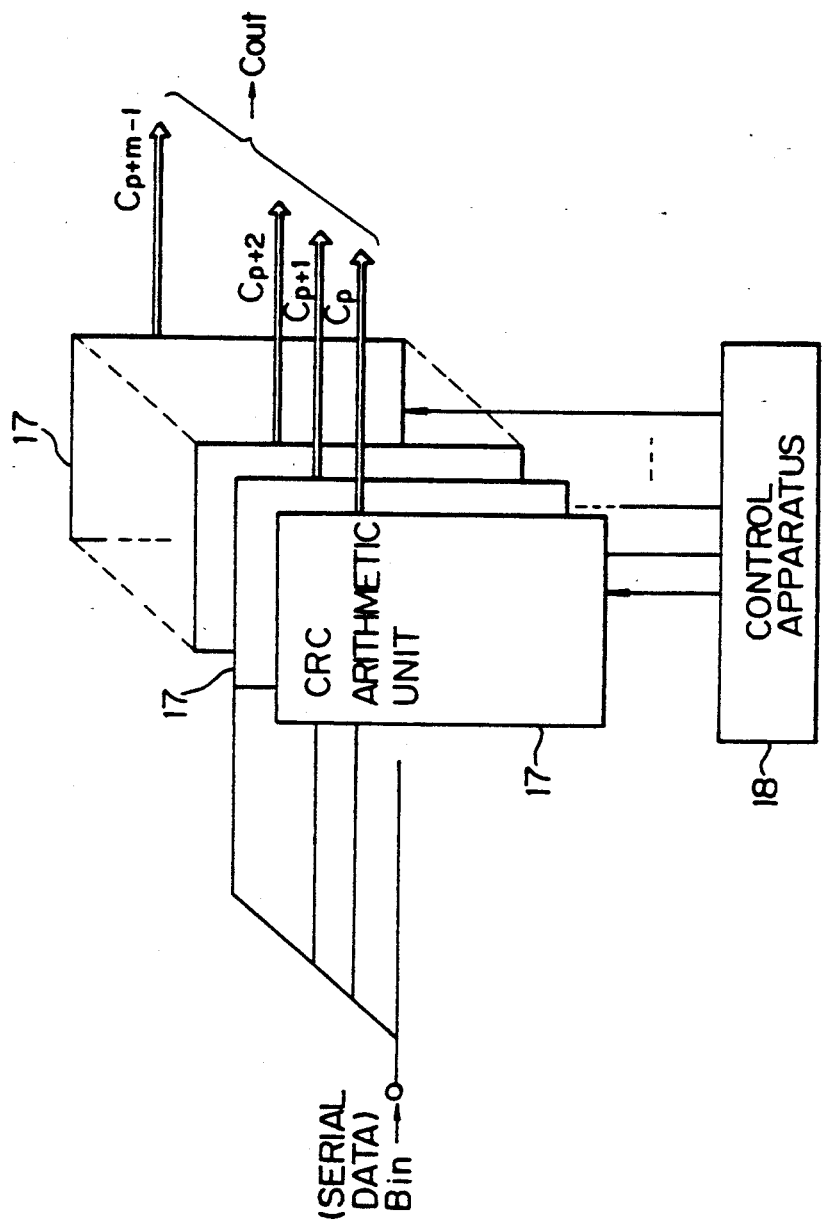
FIG. 7 is a three-dimensional block diagram of a second example of a synchronization circuit handling input bit trains having, indefinite time series.

FIG. 7 is a three-dimensional block diagram of a second example of a synchronization circuit handling input bit trains having definite time series. Continuously sought CRC arithmetic operations results $C_{out}$ are obtained from these circuits. Note that $C_p, C_{p+1} ...$ in FIG. 7 are issued at respective timings and each forms $C_{out}$.

The first example of the circuit (FIG. 6) corresponds to one based on the improvement of the first conventional example mentioned earlier (FIG. 3) and includes a multiple stage shift register 12 and a CRC arithmetic unit 16. The CRC arithmetic unit 16 is basically the same in circuit construction as the ones shown in FIG. 1 or FIG. 3.

The second example of the circuit (FIG. 7) includes a number of CRC arithmetic units 17 provided in parallel and a control apparatus 18 for controlling the units 17. The arithmetic units 17 are basically the same in construction as the fore-mentioned second conventional example (FIG. 2).

When the first conventional example (FIG. 1) is used, an increase in the number of bits m is accompanied by an exponential increase in the address space in the ROM 11 and the problem occurs of a large size of the hardware. When the improvement (FIG. 3) is used, EX-OR's 13 are connected to numerous stages and the operating speed of an ATM layer is 620 Mb/s or 155 Mb/s, so the (EX-OR) gate delay during processing becomes a problem.

On the other hand, the second conventional example (FIG. 2) is constructed so that the results appear at the point of time when the input of m bits has ended, so the second example of the circuit (FIG. 7) requires a plurality of CRC arithmetic units 17, resulting in the problems of an increased size of hardware and the need for the control apparatus 18.

Below, an explanation will be given on the synchronization circuit of the present invention, which can resolve the above-mentioned problems.

Figure 8:
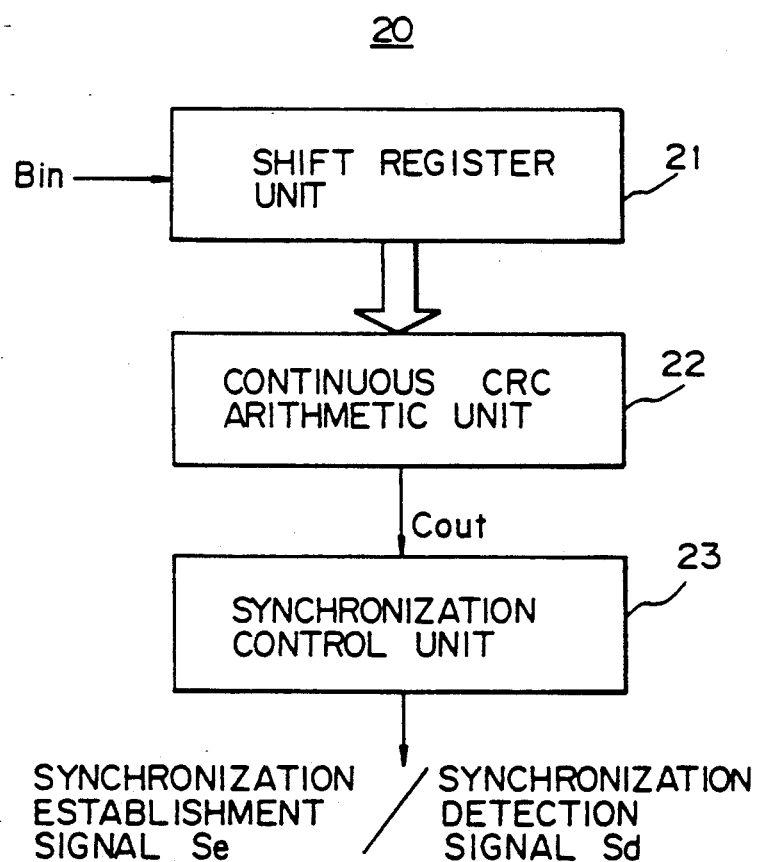
FIG. 8 is a block diagram of the principle of the synchronization circuit according to the present invention.

FIG. 8 is a block diagram of the principle of the synchronization circuit according to the present invention. In FIG. 8, the synchronization circuit 20 according to the present invention includes a shift register unit 21, a continuous CRC arithmetic unit 22, and a synchronization control unit 23.

The shift register unit 21 receives and holds in a bit serial fashion the input bit train $B_{in}$ constituting an ATM cell (FIG. 9) supplied for the data transmission.

The continuous CRC arithmetic unit 22 performs CRC arithmetic operations in accordance with a modified CRC arithmetic operation process based on the usual CRC arithmetic operation process modified to reduce the number of operations.

The synchronization control unit 23 in a transmitting unit receives the result $C_{out}$ of the CRC arithmetic operation from the continuous CRC arithmetic unit 22, inserts in the ATM cell, the CRC arithmetic operation result $C_{out}$ as a synchronization establishment signal S and transmits the ATM cell. In a receiving unit, the synchronization control unit outputs a synchronization detection signal $S_d$ when the CRC arithmetic operation result $C_{out}$ stored in the ATM cell during transmission matches the CRC arithmetic operation result $C_{out}$ obtained by operations of the continuous CRC arithmetic unit 22 in the receiving unit.

Figure 9:
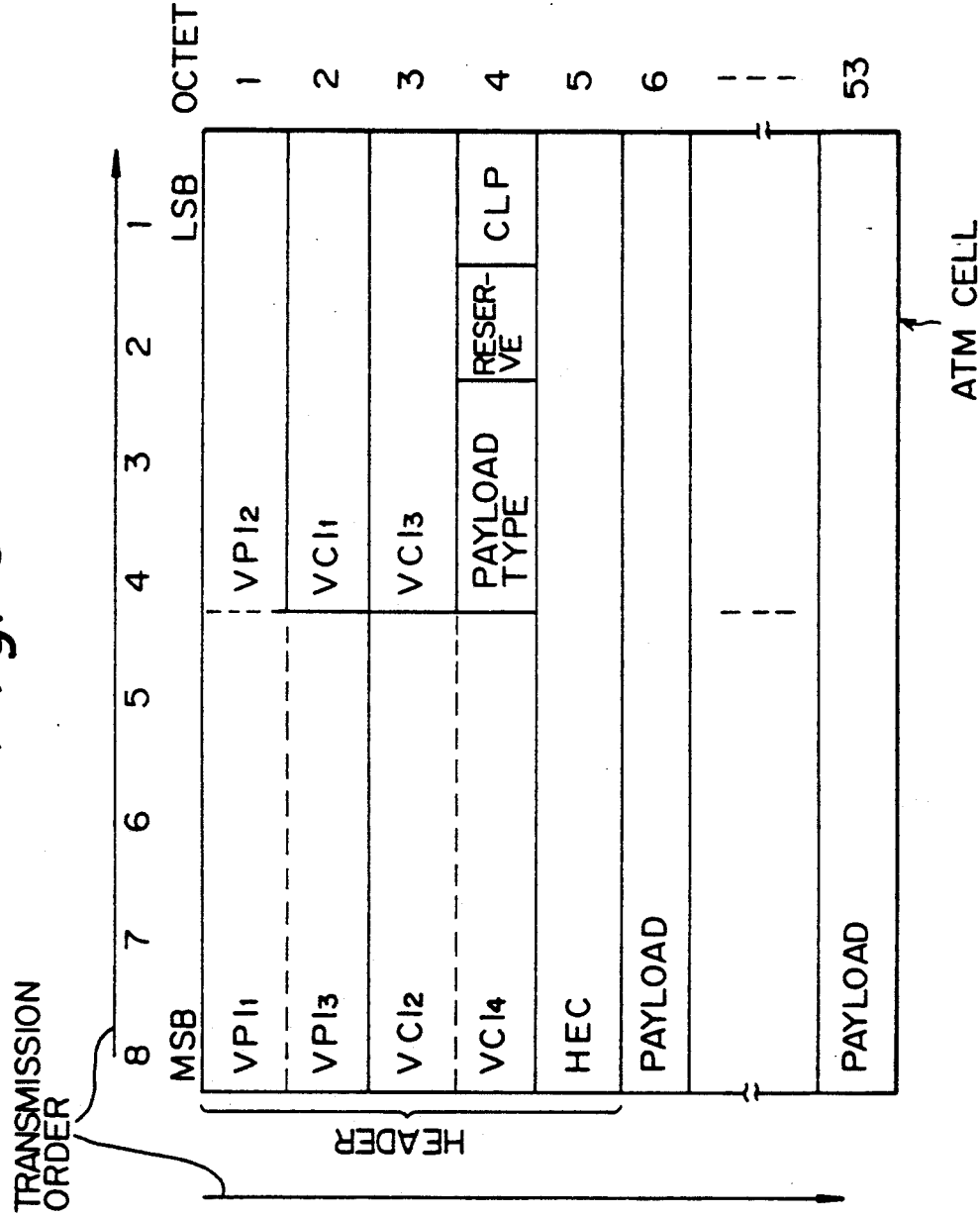
FIG. 9 is a view of the general format of an ATM cell to which the present invention is applied.

FIG. 9 is a view of the general format of an ATM cell to which the present invention is applied. In FIG. 9, the 1, 2, 3 ... 8 at the top show the bit portions from the LSB (1) to the MSB (8), and the 1, 2, 3 ... 53 at the right side are octets showing the divisions in the ATM cell (hereinafter simply referred to as "cell"). The cell is divided into a header and a payload (data in the cell). VPI (virtual path identifier) and VCI (virtual circuit identifier) show destinations of the cell. CLP is the cell loss priority. Among these, VPI1 is part of the VPI at NNI (network-network interface) and includes information for cell conflict control, known as GFC (general flow control), when a UNI (user-network interface). The previously mentioned HEC is the portion for monitoring the header as a whole.

The cell of the structure shown in FIG. 9 continuously flows along the transmission path of the ATM communication network in the order of the first octet MSB→LSB and second octet MSB→LSB. The HEC covers from the first octet to the fourth octet. If a CRC arithmetic operation including the HEC is performed, the CRC arithmetic operation results $C_{out}$ should be all "0" if the cell is normal. Further, the generator polynomial used is, for example, $$G = x^8 + x^2 + x^1 + x^0 \tag{1}$$

This all "0" state is detected and cell synchronization is continuously secured.

The usual CRC arithmetic operation process, mentioned earlier, is as follows:

For an input bit train $B_{in}$ of a certain time series:

$$\ldots a_n, a_{n+1}, a_{n+2}, \ldots a_{n+m-1}, a_{n+m}, a_{n+m+1}, a_{n+m+2} \ldots$$

if the CRC arithmetic operation results from $a_n$ to $a_{n+m-1}$ are $C_n$, and the generator polynomial used for the CRC arithmetic operation is for example the above-mentioned G, these can be expressed as $$C_n = R[(a_n\chi^{m-1} + \ldots + a_{n+m-2}\chi^1 + a_{n+m-1}\chi^0)/G] \quad (2)$$
$$F_n = a_n\chi^{m-1} + \ldots + a_{n+m-2}\chi^1 + a_{n+m-1}\chi^0$$
$$= Q_n G + C_n, \text{ where } Q_n \text{ is a quotient.} \quad (3)$$

Here, R(f/g) is the function for finding the remainder of f/g. Further, the operation is a modulo 2 operation, which is mathematically expressed as $R(f/g) = f\text{mod}_2(g)$.

Usually, the number of operations required for the above function R(f/g) is tremendous, therefore the hardware required for the CRC arithmetic operation becomes large in size and the above-mentioned problem occurs. The present invention greatly reduces the number of the operations by the shift register unit 21 and the continuous CRC arithmetic unit 22.

Figure 10:
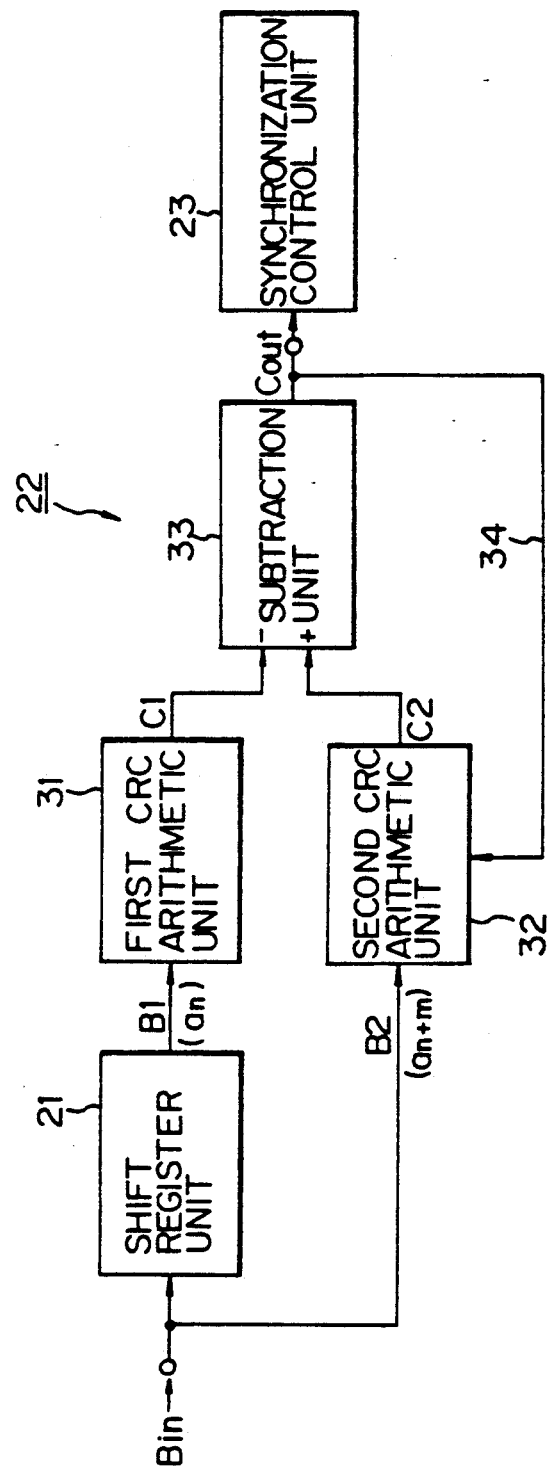
FIG. 10 is a block diagram of the principle used in a first embodiment of the present invention.

FIG. 10 is a view of a first embodiment of the present invention. In FIG. 10, the first CRC arithmetic unit 31 deems the overflow bit (B1) forced out from the shift register unit 21 to be a term of the m-th order, divides this term of the m-th order by the generator polynomial used for the CRC arithmetic operation, and deems the remainder to be the first CRC arithmetic operation result C1.

The second CRC arithmetic unit 32 deems the bit appearing at the second bit train B2 at the same time that the overflow bit B1 is forced out to be the term of the 0-th order, adds the 0-th order term and the remainder after dividing the immediately preceding CRC arithmetic operation result $C_{out}$ by the generator polynomial G, and uses the value as the second CRC arithmetic operation result C2.

The difference between C1 and C2 is then obtained by the subtraction unit 33 and is used as the new CRC arithmetic operation result $C_{out}$.

In the above first embodiment, the continuous CRC arithmetic unit 22 is based on the following equations.

Referring once again to the above-mentioned equation (2) and equation (3), first the CRC arithmetic operation result $C_{n+1}$ obtain after shifting the $C_n$ in equation (2) by one bit is $$C_{n+1} = R[F_{n+1}/G] \quad (4)$$

$F_{n+1}$ is the object of the CRC arithmetic operation shifted one bit from $F_n$, so $$C_{n+1} = R[(F_n\chi - a_n\chi^m + a_{n+m}\chi^0)/G] \quad (5)$$
$$= R[(Q_n G + C_n)\chi - a_n\chi^m + a_{n+m}\chi^0/G]$$

Breaking this down, $$C_{n+1} = R[(Q_n G\chi)/G] = +R[(C_n\chi - a_n\chi^m + a_{n+m}\chi^0)/G] \quad (6)$$

The first term is the remainder 0, so this is deleted and $$C_{n+1} = R[(C_n\chi - a_n\chi^m + a_{n+m}\chi^0)/G] \quad (7)$$

Breaking this down further, $$C_{n+1} = R[(C_n\chi)/G] - R[a_n\chi^m)/G] + R[(a_{n+m}\chi^0)/G] \quad (8)$$

The $C_n$ in the operator of the first term corresponds to the value from the feedback line of FIG. 10. The operation of the second term relates to the arithmetic unit 31 and the operation of the third term relates to the arithmetic unit 32. Note that the third term is of a lower order than the generator polynomial G and in actuality is in itself immediately the remainder, so the following expression is possible:

$$C_{n+1} = R[(C_n\chi)/G] - R[a_n\chi^m)/G] + a_{n+m}\chi^0 \quad (9)$$

Equation (7) means that to find $C_{n+1}$, one may perform a CRC arithmetic operation on $$C_n\chi - a_n\chi^m + a_{n+m}\chi^0.$$

Further, equation (9) means that to find $C_{n+1}$, one may

[1] perform a CRC arithmetic operation on $C_n\chi$,
[2] subtract the results of the CRC arithmetic operation on $a_n\chi^m$, and
[3] add $a_{n+m}\chi^0$.

Here, operation [1] is possible in the first conventional example (FIG. 1) since the number of bits is small and further, since continuous processing is performed, operation [1] is possible in the second conventional example (FIG. 2) as well. Operation [2] gives figures which easily determined since when $a_n$ is "0", the operation results are all "0" and when $a_n$ is "1", the operation results are $$R = [\chi^m/G] \quad (10)$$

Operation [3] indicates whether the last 1 bit in the results of [1] and [2] is inverted.

Figure 11:
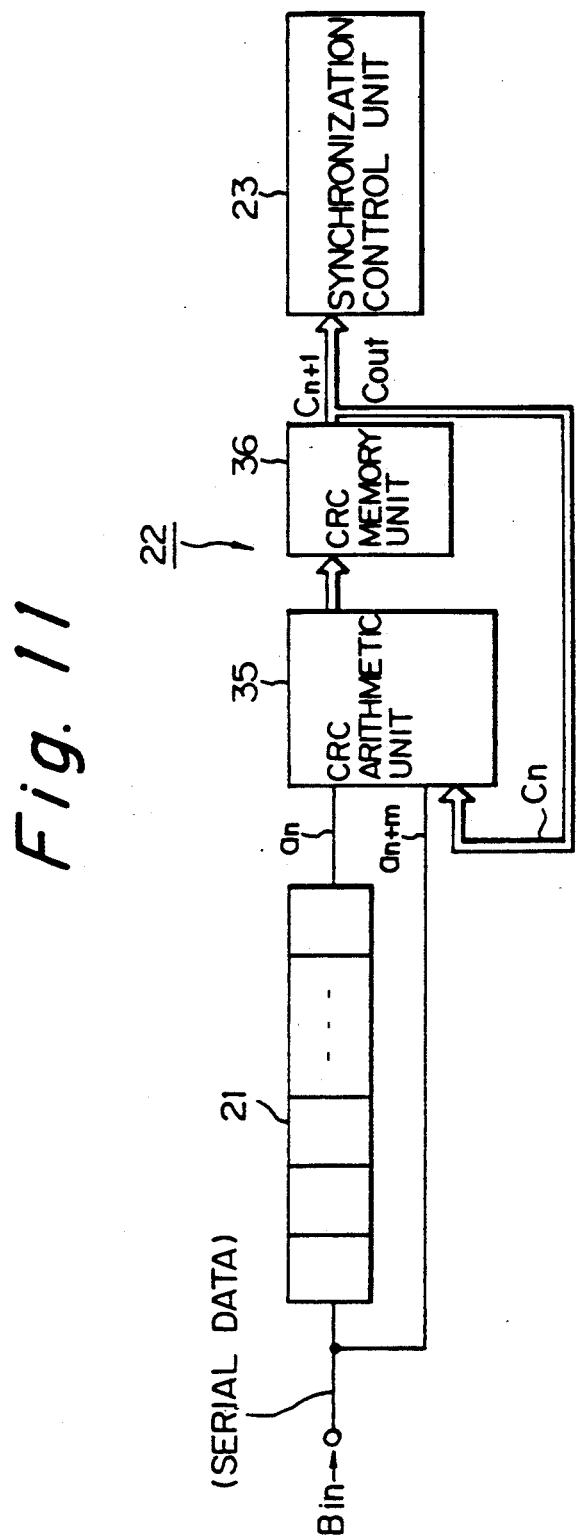
FIG. 11 is a block diagram of an example of the first embodiment.

If the first embodiment is more practically constructed, it becomes as shown in FIG. 11.

FIG. 11 is a block diagram of an example of the first embodiment. As illustrated, this includes an m-bit shift register 21, a CRC arithmetic unit 35, and a CRC memory unit 36. The operation will be explained below:

(i) In the initial state (a state where the data bit train $B_{in}$ is not input to the continuous CRC arithmetic unit 22), the shift register 21 and the CRC memory unit 36 are reset to all "0".

(ii) In the state after the initial state, $a_1$ is input to the LSB of the shift register 21 and to the CRC arithmetic unit 35. At this time, in the shift register 21, the data is shifted from the LSB towards the MSB. Further at this time, the CRC arithmetic operation result of the state just before (the initial state), that is, the all "0" state, from the CRC memory unit 36 and the "0" from the MSB (output) of the shift register 21 are input simultaneously to the CRC arithmetic unit 35. In this state, the CRC arithmetic unit 35 determines the next CRC arithmetic operation value and stores it in the CRC memory unit 36.

(iii) In the state after (ii), $a_2$ is input to the LSB input) of the shift register 21 and the CRC arithmetic unit 35. At this time, in the shift register 21, the data is shifted in the direction from the LSB towards the MSB. Further at this time, the CRC arithmetic operation value of the state just before state (ii) from the CRC memory unit 36 and the "0" from the MSB of the shift register 21 are input simultaneously to the CRC arithmetic unit 35. In this state, the CRC arithmetic unit 35 determines the next CRC arithmetic operation value and stores it in the CRC arithmetic memory unit 36.

(iv) When $a_{m+1}$ is to be input, $a_{m+1}$ is input to the LSB (input) of the shift register 21 and the CRC arithmetic unit 35. At this time, in the shift register 21, the data is shifted in the direction from the LSB to the MSB. Further at this time, the CRC arithmetic operation value of the state just before the CRC memory unit 36 and the $a_1$ from the MSB of the shift register 21 are input simultaneously to the CRC arithmetic unit 35. In this state, the CRC arithmetic unit 35 determines the CRC arithmetic operation value and stores it in the CRC memory 36.

(v) In general, when $C_n$ (CRC arithmetic operation result from $a_n$ to $a_{n+m-1}$) is stored, the next data $a_{n+m}$ is input to the LSB (input) of the shift register 21 and the CRC arithmetic unit 35. At this time, in the shift register 21, the data is shifted from the LSB towards the MSB. Further at this time, the $C_n$ from the CRC memory unit 36 and the a from the MSB of the shift register 21 are input simultaneously to the CRC arithmetic unit 35. In this state, the CRC arithmetic unit 35 determines the next CRC arithmetic operation value $C_{n+1}$ and stores it in the CRC memory unit 36.

The CRC arithmetic operation of the first embodiment (FIG. 10) mentioned above may be summarized as follows:

The shift register unit 21 gives a delay of a length of m bits to the input bit train $B_{in}$.

The first CRC arithmetic unit 31 receives the first bit train B1 forced out from the shift register unit 21 and performs the first CRC arithmetic operation.

The second CRC arithmetic unit 32 receives the second bit train B2 also input to the shift register unit 21, performs the second CRC arithmetic operation and adds the previous $C_{out}$.

The subtraction unit 33 finds the difference between the first CRC arithmetic operation results C1 and the second CRC arithmetic operation results C2 from the first CRC arithmetic unit 31 and the second CRC arithmetic unit 32, respectively. The new CRC arithmetic operation result $C_{out}$ is obtained from the subtraction unit 33 in a time series.

The continuous CRC arithmetic unit 22 of the present invention, referring to FIG. 5, when performing a CRC arithmetic operation of the q+1-st bit train, shifts the bits at the q+1-st place and thereby the bits ($a_n$) of the q-th bit train and the newly entered bits ($a_{n+m}$) of the (q+1)-st bit train to align at the same timing, performs the CRC calculation, and sends out the difference of the CRC arithmetic operation results continuously for each bit.

Figure 12:
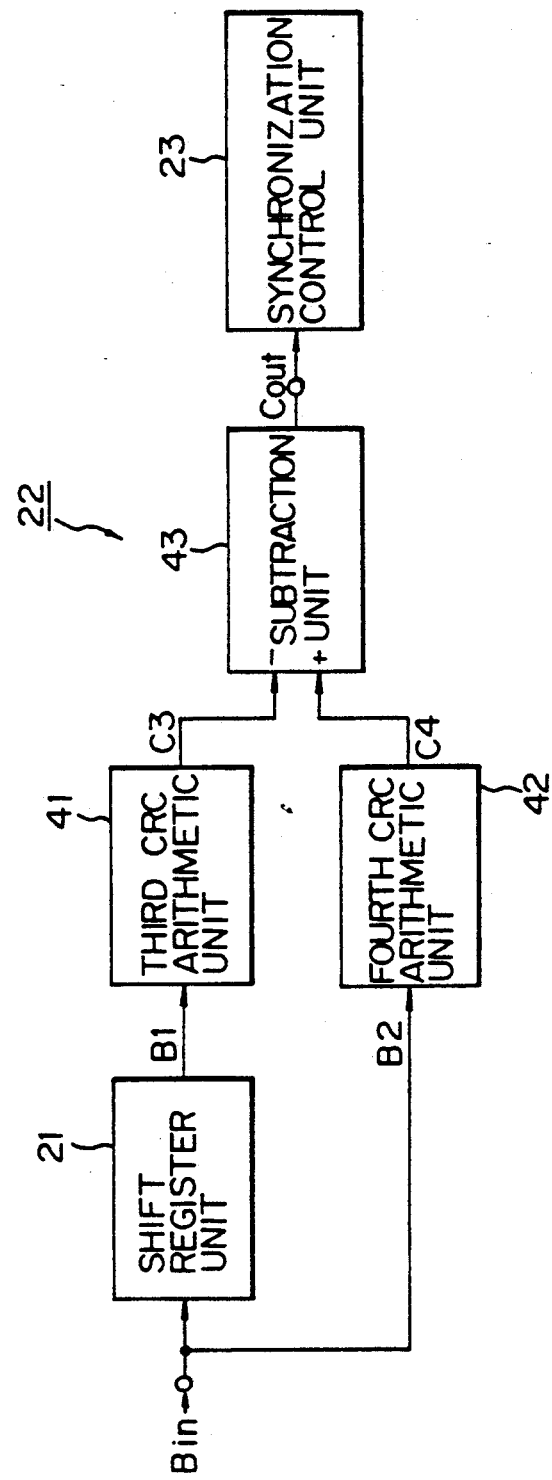
FIG. 12 is a block diagram of the principle used in a second embodiment of the present invention.

FIG. 12 is a block diagram of the principle used in a second embodiment of the present invention. In FIG. 12, a third CRC arithmetic unit 41 divides the first bit train B1, which has been delayed by m bits and deemed as a m-th order term, by the generator polynomial used for the CRC arithmetic operation and deems the remainder obtained to be the third CRC arithmetic operation result C3.

A fourth CRC arithmetic unit 42 divides the second bit train B2 by the generator polynomial G, where the second bit train B2 corresponds to the first bit train B1 added to the same bit train B1 shifted (delayed) by the shift register 21 and deems the remainder obtained to be the fourth CRC arithmetic operation result C4. That is, the third CRC arithmetic unit 41 and the fourth CRC arithmetic unit 42 perform CRC arithmetic operations on the following B1 and B2 for the bit train comprised of $a_{n-2}, a_{n-1}, a_n, a_{n+1} \ldots a_{n+m-1}, a_{n+m}, a_{n+m+1}$:

B1: "$\ldots a_{n-2}, a_n, 0, 0, 0, 0 \ldots 0$" (where there are m number of 0's)

B2: "$\ldots a_{n-2}, a_n, a_{n+1}, a_{n+2} \ldots a_{n+m-1}$"

Here, the portions "$\ldots$" at the beginning of the bit trains B1 and B2 start at the same time portions for both B1 and B2, for example, from $a_0$ or $a_1$.

The difference between C3 and C4 is obtained by the subtraction unit 43 and is used as the CRC arithmetic operation result.

In the above-mentioned second embodiment, the continuous CRC arithmetic unit 22 is based on the following equations:

In the same way as explained with regard to the first embodiment, if, an input bit train $B_{in}$ has a certain time series:

$$\ldots a_n, a_{n+1}, a_{n+2} \ldots a_{n+m-1}, a_{n+m}, a_{n+m+1}, a_{n+m+2} \ldots$$

The CRC arithmetic operation result for the bit train from $a_n$ to $a_{n+m-1}$ is $C_n$ and the generator polynomial used for the CRC arithmetic operation is G, as expressed by the equations (2) and (3) above.

In equation (2), $C_n$ is expressed as $$C_n = R[(a_n\chi^{m+1} + \ldots + a_{n+m-2}\chi^1 + a_{n+m-1}\chi^0)/G] \qquad (11)$$

equation (11) may be rewritten in the following way:

$$C_n = R[(\ldots + a_{n-2}\chi^{m+1} + a_{n-1}\chi^{m^n} + a_n\chi^{m-1} + \ldots + a_{n+m}\chi^1 + a_{n+m-1}\chi^0)/G] - R[(\ldots + a_{n-2}\chi^{m+1} + a_{n-1}\chi^m)/G] \qquad (12)$$

The principle of derivation of this equation (12) is as follows:

Consider the bit train of $a_t, a_{t+1}, \ldots a_{n-1}, a_n, a_{n+1}, \ldots a_{n+m}, a_{n+m+1}$ divided into the following two bit trains:

B1: $a_t, a_{t+1}, \ldots a_{n-1}, 0, 0, 0 \ldots 0$ (where there are m number of 0's)

B2: $a_t, a_{t+1}, \ldots a_n, a_{n+1}, \ldots a_{n+m-2}, a_{n+m-1}$

Equation (12) originally covered the following bit train:

B0: $a_n, a_{n+1}, \ldots a_{n+m-2}, a_{n+m-1}$

Therefore, B0 is equivalent to B2-B1. Here, the first term on the right side (R[ $\ldots$ ]) of equation (12) shows the bit train B2, while the second term (-R[ $\ldots$ ]) shows the bit train B1. Here, the first bits of the bit trains B1 and B2 are both $a_t$, so the bit trains start at the same time position.

Figure 13:
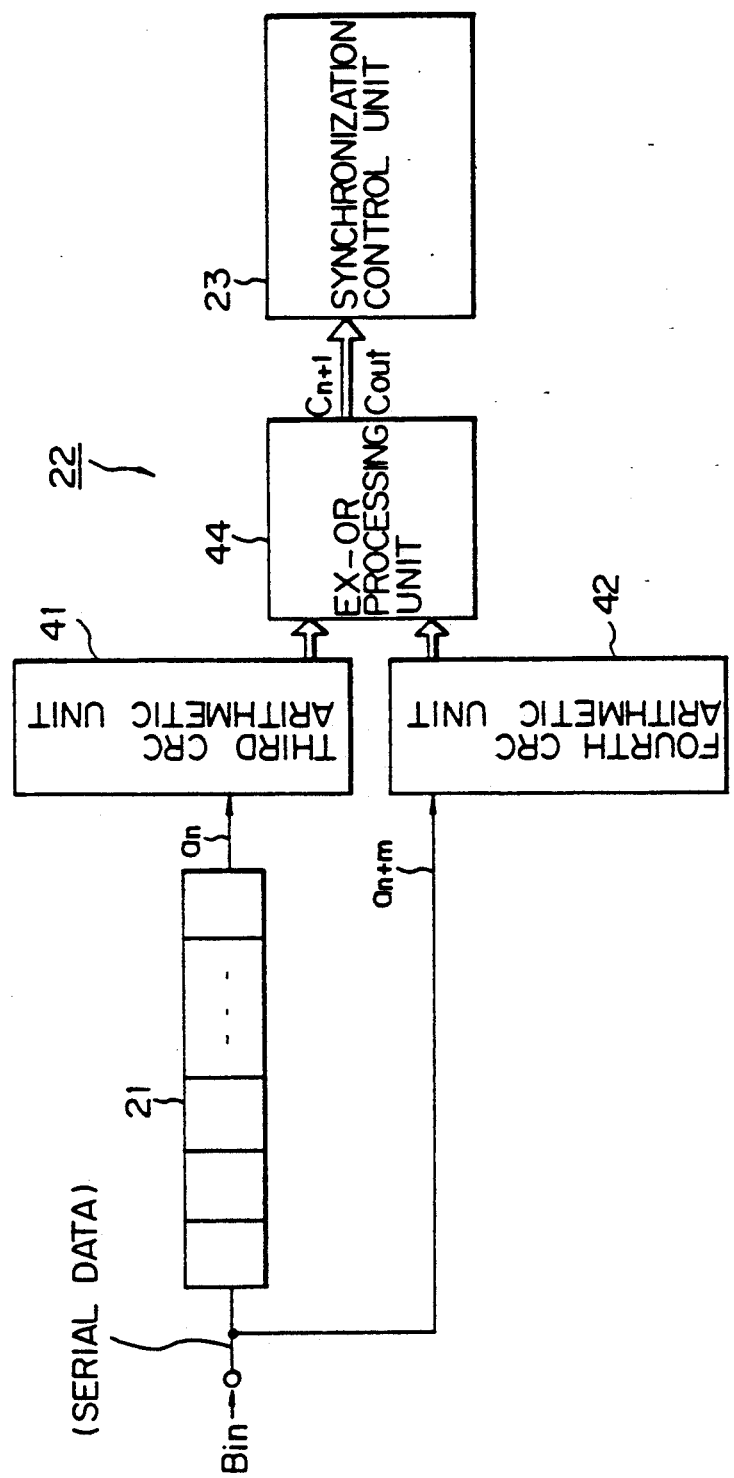
FIG. 13 is a block diagram of an example of the second embodiment.

If the second embodiment is constructed more practically, the result is FIG. 13.

FIG. 13 is a block diagram of an example of the second embodiment. As illustrated, it includes an m-bit shift register 21, the above-mentioned third CRC arithmetic unit 41 and fourth CRC arithmetic unit 42, and an exclusive OR (EX-OR) processing unit 44. The operation will be explained below.

The third CRC arithmetic unit 41 is for performing the operation of the second term of the equation (12), and the fourth CRC arithmetic unit 42 is for performing the operation of the first term of the equation (12). In modulo 2 operations, addition and subtraction can be processed by EX-OR, so by finding the EX-OR of the operation results of the CRC arithmetic unit 41 and the CRC arithmetic unit 42 by the EX-OR processing unit 42, the target CRC arithmetic operation results $C_{out}$ can be obtained.

It is possible therefore to continuously obtain CRC arithmetic operation results for input bit trains having indefinite time series while shifting by one bit at a time and the extraction of cells under the above-mentioned full ATM layer can be easily realized.

Below, detailed examples will be given of the above-mentioned first embodiment and second embodiment.

Figure 14:
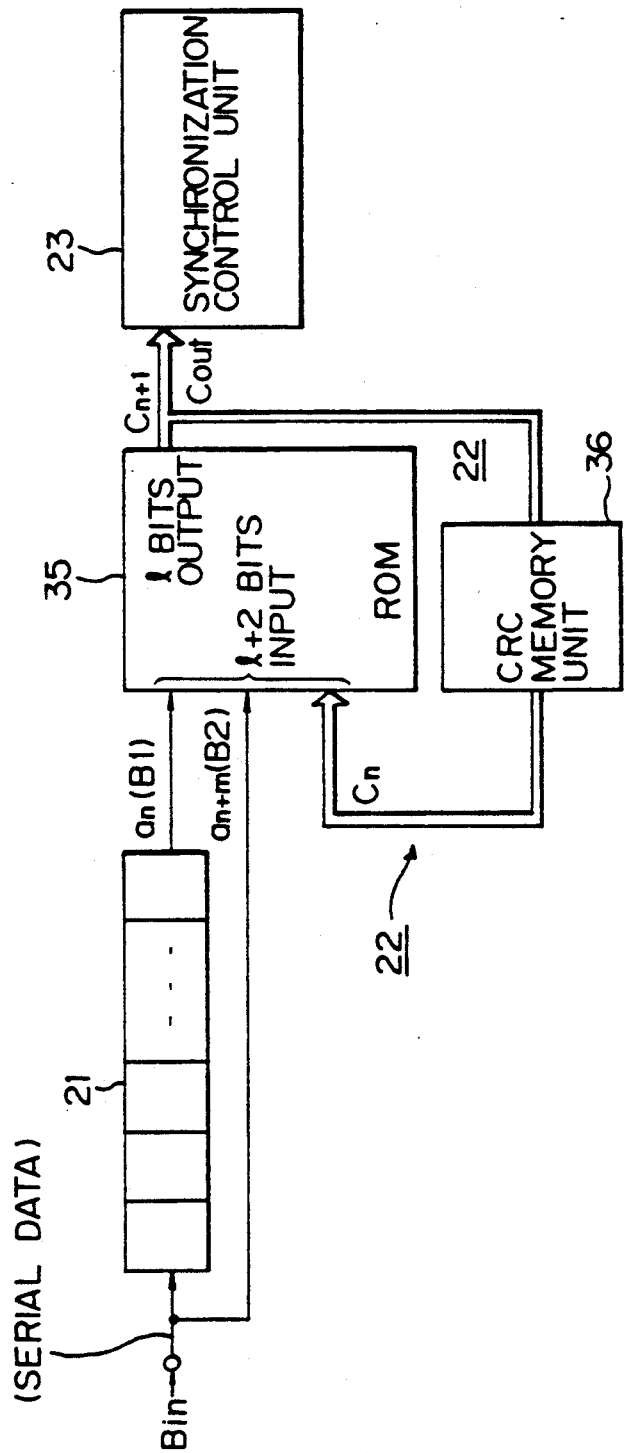
FIG. 14 is a first more detailed block diagram of the first embodiment.

FIG. 14 is a first more detailed block diagram of the first embodiment. The CRC arithmetic unit 35 of FIG. 11 is shown as a ROM 35 in this figure. Further, the ROM 35 may be replaced with the parallel connection type CRC arithmetic unit of FIG. 3. In the example of FIG. 14, m=40 bits and l (remainder)=8 bits. 40=8 bits×5 octets.

Figure 15:
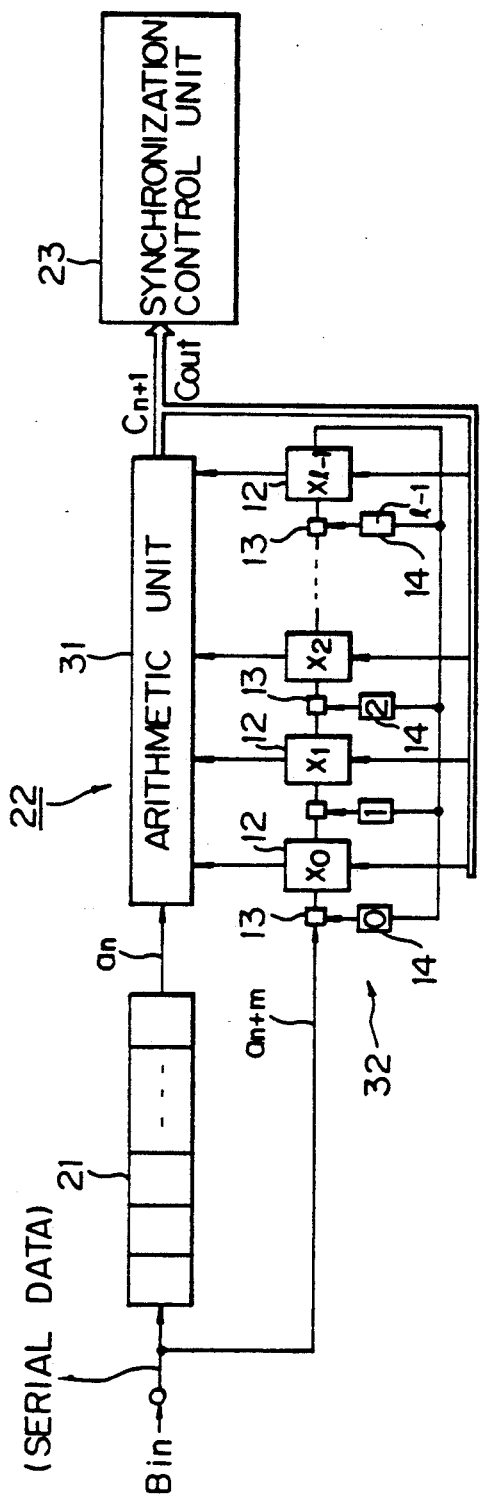
FIG. 15 is a second more detailed block diagram of the first embodiment.

FIG. 15 is a second more detailed block diagram of the first embodiment. The second detailed example is based on the second conventional example (FIG. 2) mentioned earlier. Of the first and second CRC arithmetic units 31 and 32 of FIG. 10, the former (31) is an arithmetic unit receiving $a_n$ and the latter (32) corresponds to the CRC arithmetic unit of FIG. 2.

The arithmetic unit 31 receiving $a_n$ finds the EX-OR of $$R[\chi^n/G]$$

and the output of the shift register when $a_n$ is "1" and outputs the value of the equation (13) as it is when $a_n$ is "0". Further, the results ($C_{n+1}$) are reloaded to the shift register 12. Note that the EX-OR gate 13 and connector 14 are also previously explained. In the example of FIG. 15, m=40 bits and l=8 bits and $$R[\chi^{40}/G]=\chi^7+\chi^6+\chi^1 \quad (14)$$

Further, when the generator polynomial is defined by equation (1), the "0", "1", and "2" of the connector 14 are connected while the "3", "4", "5", "6" (not shown in the figure) and "7" (l-1) of the connector 14 are not connected and are fixed at "0".

Figure 16:
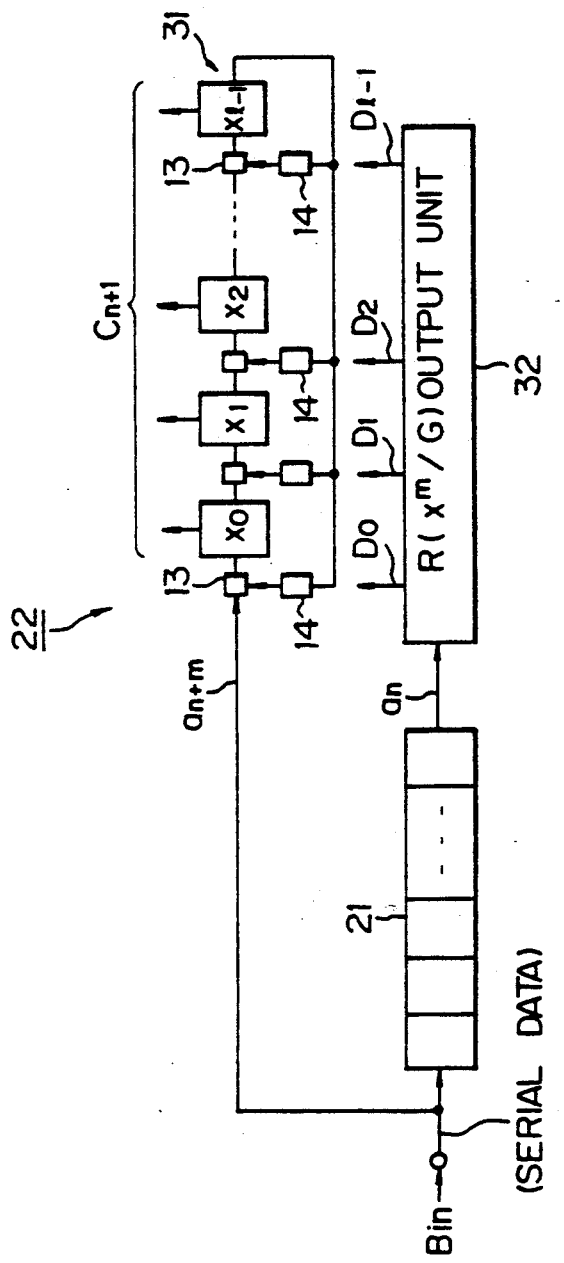
FIG. 16 is a third more detailed block diagram of the first embodiment.

FIG. 16 is a third more detailed block diagram of the first embodiment and is based on the construction of FIG. 15 with some modifications. Of the first and second CRC arithmetic units 31 and 32 of FIG. 10, the former (31) corresponds to the CRC arithmetic unit of FIG. 2 and the latter (32) is comprised of an $R(\chi^m/G)$ output unit.

The $R(\chi^m/G)$ output unit 32 outputs a value based on equation (13) when a is "1". Therefore, $D_i$ outputs the truth value "1" in accordance with $R(\chi^m/G)$ when the header of X is "1" and $a_n$ is "1". Further, each reference numeral 13 is a three input EX-OR gate which obtains the EX-OR of the output $\chi_{l-1}$ of the shift register 12 via connector 14, the output $\chi_{i-1}$ of the previous stage and the corresponding output $D_i$ of the CRC arithmetic unit 32 and output the result for that stage $\chi_i$ of CRC arithmetic unit 31.

Here, the constants are the same as in the case of the above-mentioned second detailed example (FIG. 15). Regarding $D_i$, $$R[\chi^{40}/G]=\chi^7+\chi^6+\chi^1 \quad (15)$$

so $D_1$, $D_6$ and $D_7$ are "1" when $a_n$ is "1" and $D_0$, $D_2$, $D_3$, $D_4$, and $D_5$ are fixed at "0".

Figure 17:
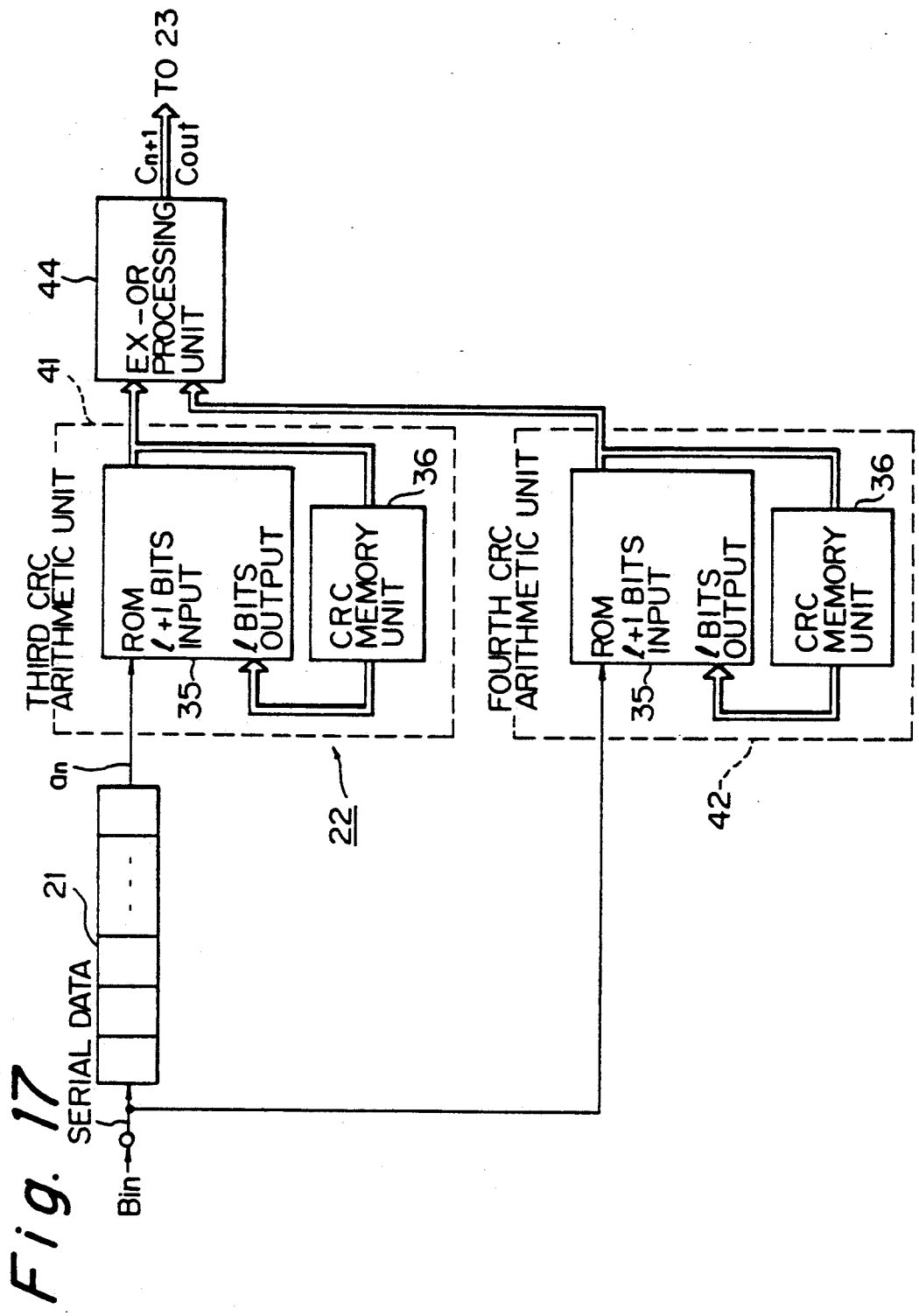
FIG. 17 is a first more detailed block diagram of the second embodiment.

FIG. 17 is a first more detailed block diagram of the second embodiment. As the CRC arithmetic units 41 and 42 of FIG. 13, use is made of the construction of the ROM 35 and the CRC memory unit 36 of FIG. 14.

Figure 18:
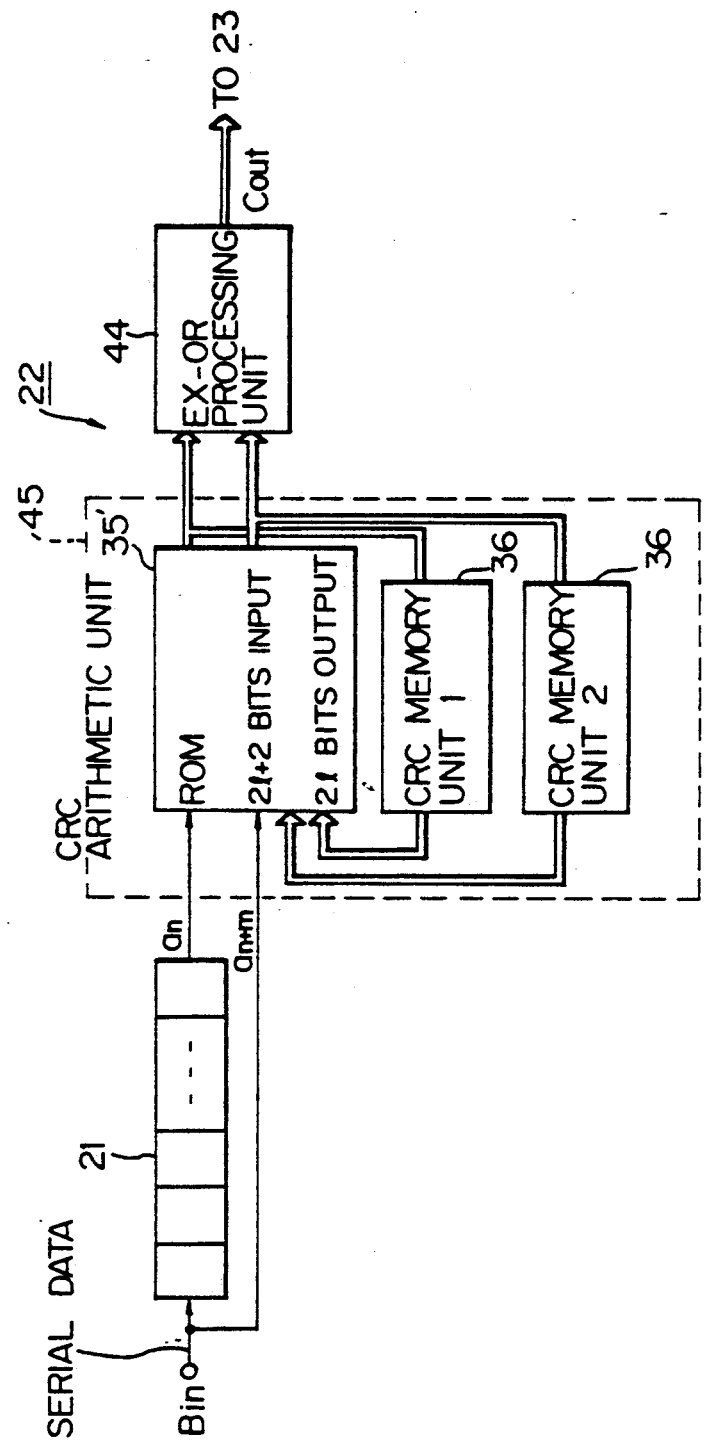
FIG. 18 is a second more detailed block diagram of the second embodiment.

FIG. 18 is a second more detailed block diagram of the second embodiment. Use is made of a CRC arithmetic unit 45 combining the two CRC arithmetic units 41 and 42 shown in FIG. 17. Note that in place of the ROM 35 of FIG. 17, use is made of a ROM 35' with a 2l+2 bit input and 2l bit output in FIG. 18.

Figure 19:
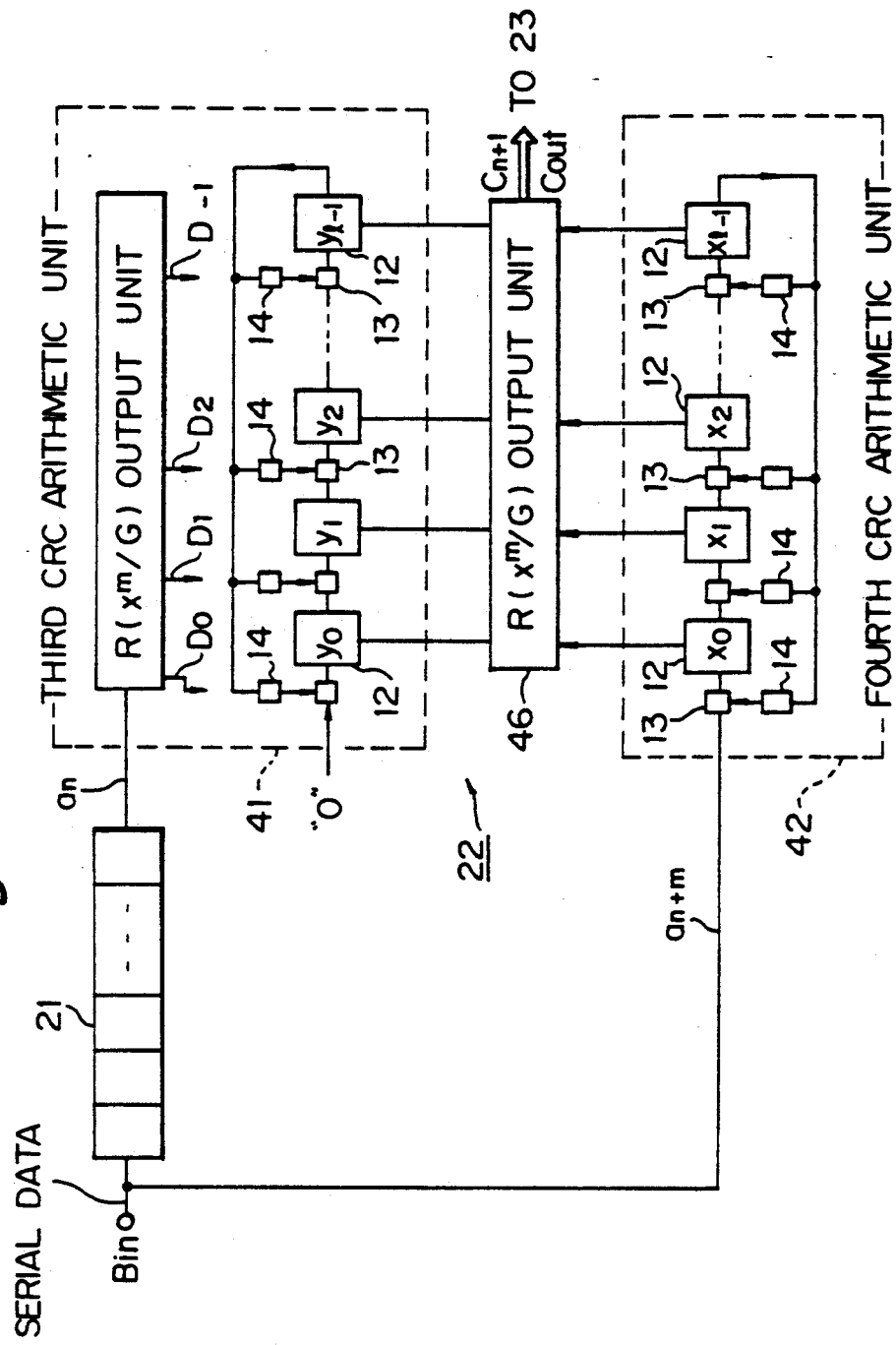
FIG. 19 is a third more detailed block diagram of the second embodiment.

FIG. 19 is a third more detailed block diagram of the second embodiment. As the CRC arithmetic unit 41 of FIG. 13, use is made of the construction of FIG. 16, as the CRC arithmetic unit 42 of FIG. 13, use is made of the construction of FIG. 2, and as the EX-OR processing unit 44 of FIG. 13, use is of the $R(\chi^m/G)$ output unit 46. The constants in FIG. 19 are the same as in the case explained for FIG. 16.

Figure 20:
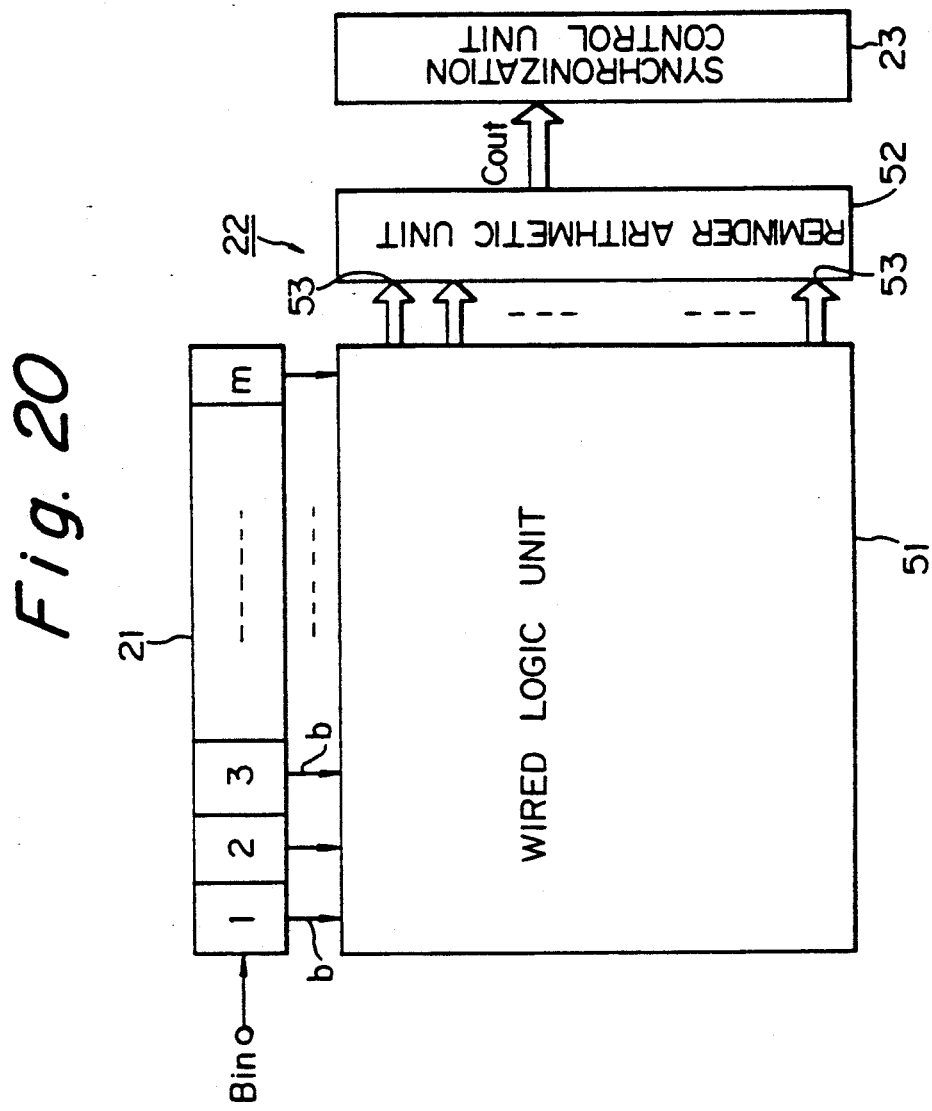
FIG. 20 is a block diagram of the principle used in a third embodiment of the present invention.

FIG. 20 is a block diagram of the principle used in a third embodiment of the present invention. In FIG. 20 the continuous CRC arithmetic unit 22 includes a wired logic unit 51 and a remainder arithmetic unit 52. The wired logic unit 51 receives as input the m number of bit outputs b corresponding to the bits from the m-bit shift register unit 21 and distributes the m number of bit outputs b to predetermined bit positions set in advance of each of the m bits of output in the plurality of bit positions. The remainder arithmetic unit 52 is provided with a plurality of input gates 53 corresponding to the above-mentioned plurality of bit positions, executes the addition of the above-mentioned bit outputs b distributed to each of the input gates 53, and calculates the remainder, which is equal to the remainder which would be obtained by dividing the input bit train $B_{in}$ by the generator polynomial G. This is given to the synchronization control unit 23 as the arithmetic operation result $C_{out}$.

The third embodiment was established taking note of a mathematical method. The explanation of this mathematical method would be somewhat complicated, so first the general idea will be briefly explained.

The remainder (R) obtained by dividing the decimal number "1013" (corresponding to the input bit train $B_{in}$) by "2" (corresponding to the generator polynomial G) is usually found as follows:

```
     506
  _____
2 | 1013
    10
    __
    13
    12
    __
     1 ... remainder.
```

Taking note of a certain mathematical property, however, it is possible to similarly find the remainder by adding the remainders of the digits, that is, by finding reminders for the numbers represented by each digit as follows:

```
1013 = 1000 ... 0
       + 10 ... 0
       +  3 ... 1
``` and adding the remainders using modulo addition of the divisor, in this case, modulo 2:

0+0+1="1"

so it is possible to obtain the remainder "1".

Next, a more detailed explanation will be made of the above-mentioned mathematical method.

If the received code of the input bit train $B_{in}$ held by the m-bit shift register unit 21 is expressed as the polynomial $C(\chi)$, the following equation is obtained:

$$C(\chi) = C_{m-1}\chi^{m-1} + C_{m-2}\chi^{m-2} + C_{m-3}\chi^{m-3} + \ldots + C_0\chi^0 \quad (16)$$

Next, $C(\chi)$ is divided by the generator polynomial $G(\chi)$. Here, the explanation will be made of the case of division by the generator polynomial of g+1 bits as the generator polynomial $G(\chi)$. If $G(\chi) = \chi^8 + \chi^2 + \chi^1$, g=8 (8-th order), but here the explanation will be made of the general method in the case of finding the CRC arithmetic operation result (remainder) $R(\chi)$ by performing the CRC arithmetic operation (division) by the generator polynomial of g+1 (e.g., 9) bits.

The operation result $R(\chi)$ at this time is expressed by:

$$R(\chi) = C(\chi) \bmod(G(\chi)) \quad (17)$$

$$= \sum_{p=0}^{m-1} [C_p \chi^p \bmod_2(G(\chi))]$$

where $\bmod_2$ is a modulo 2 operation. Further, p is the order of the input bit train $B_{in}$, for example p=0 to p=39 (in case of input bit train $B_{in}$ of 40 bits).

Here, to further develop the equation, a code train $E_p(\chi)$ with a special value is introduced:

$$E_p(\chi) = \chi^p \quad (18)$$

That is, $E_p(\chi)$ is a figure where only the coefficient of the term of the p-th order is 1 and the remaining coefficients are all 0 (see 1000 and 10 in the base 10 division of 1013 above).

If the $E_p(\chi)$ is inserted in the above equation (17), then the following is obtained:

$$R_p(\chi) = E_p(\chi) \bmod(G(\chi)) \quad (19)$$

$$= \chi^p \bmod(G(\chi))$$

The $R_p(\chi)$ of this equation (19) can be expressed as follows:

$$R_p(\chi) = r_{pg}\chi^g + r_{pg-1}\chi^{g-1} + r_{pg-2}\chi^{g-2} + \ldots + r_{p0}\chi^0 \quad (20)$$

$$= \sum_{j=0}^{g} [r_{pj}\chi^j]$$

Note that g in equation (20) is the order of the generator polynomial.

Therefore, if equation (20) and equation (17) are inserted in equation (19), the following equation (21) is obtained:

$$R(\chi) = \sum_{p=0}^{m-1} \{C_p E_p(\chi) \bmod(G(\chi))\} \quad (21)$$

$$= \sum_{p=0}^{m-1} \{C_p R_p(\chi)\}$$

$$= \sum_{p=0}^{m-1} \left\{ C_p \sum_{j=0}^{g} [r_{pj}\chi^j] \right\}$$

$$= \sum_{j=0}^{g} \left\{ \left[ \sum_{p=0}^{m-1} (C_p r_{pj}) \right] \chi^j \right\} \quad (22)$$

The point to be noted here is the conversion from equation (21) to equation (22). This is based on the known conversion rule that the value does not change even if the order of summation ($\Sigma$) is switched. The coefficient $r_j$ of the term of the j-th order of the remainder $R(\chi)$ found by this equation (22) may be found by using equation (23):

$$r_j = \sum_{p=0}^{m-1} (C_p r_{pj}) \quad (23)$$

This equation (23) corresponds to funding the sum of the remainders of the individual digits in the above-mentioned brief explanation (0+0+1="1").

Therefore, the number of the terms where the coefficient of the term of the p-th order (0 to 39) of the received code $C(\chi)$ is "1", that is, the term of $r_{pj} = 1$ (j is 0 to 7)

is counted. If the result of the counting is an odd number, then $r_j = 1$, while if the result of the counting is an even number then $r_j = 0$. This can easily be found by a parity check operation.

When incorporating a wire logic unit 51 of FIG. 20 based on the above-mentioned mathematical method, the remainder $R(\chi)$ obtained by dividing each of the above-mentioned $E_p(\chi)$ by the generator polynomial $G(\chi)$ is decided readily in advance, so by using this it is possible to make the wired logic unit 51 and the remainder arithmetic unit 52 extremely simple in construction and reduce the size of the hardware required.

Figure 21:
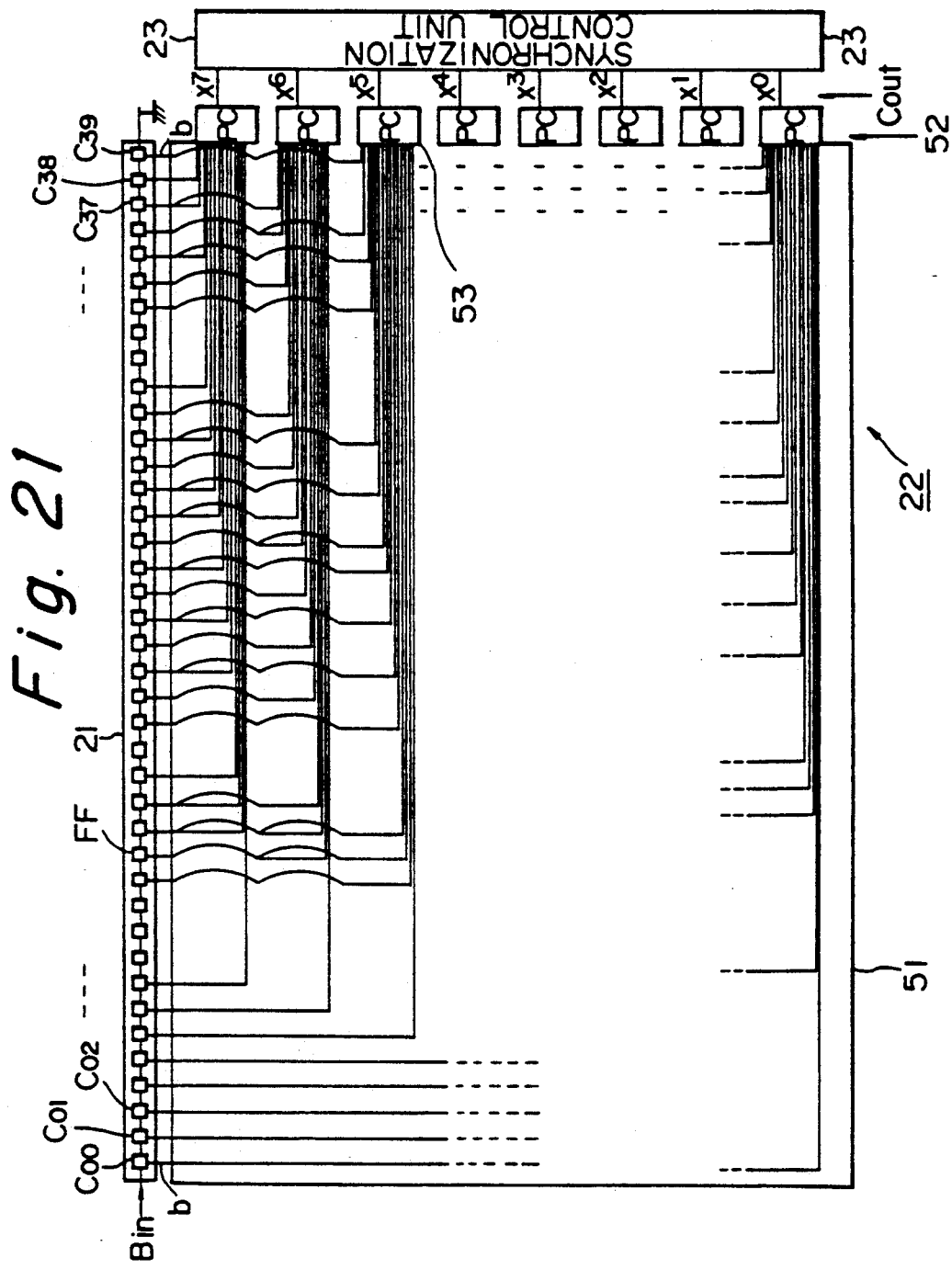
FIG. 21 is a block diagram of the third embodiment.

FIG. 21 is a block diagram of the third embodiment. In FIG. 21, the wired logic unit 51 is made of the wiring illustrated. The input side is connected to an m-bit shift register 21 (in the figure, m=0 to m=39), each bit part being comprised of a flipflop FF. $C_{00}, C_{01} \ldots C_{39}$ correspond to the above-mentioned $C(\chi)$. The output side of the wired logic unit 51 enters the input gates 53 of the remainder arithmetic unit 52. The input gates 53 are, for example, known parity check circuits (PC). The bits $\chi^7$, $\chi^6 \ldots \chi^0$) output from the parity check circuit PC (for example, each an EX-OR gate group) become the CRC arithmetic operation results $C_{out}$ (corresponding to the above-mentioned $R(\chi)$). In the same way as the above-mentioned embodiments, this $C_{out}$ is input to the synchronization control unit 23.

Since the CRC arithmetic operation results for a monomial can be found in advance by calculation, the wired logic unit 51 of FIG. 21 has its internal wiring determined by the calculation results. That is, as mentioned above, the remainder $R(\chi)$ obtained by dividing the above-mentioned $E_p(\chi)$'s one by one by the generator polynomial $G(\chi)$ is determined readily in advance, so this is used.

FIG. 22 is a view of the bit pattern for constructing the wired logic unit 51 of FIG. 21. In the bit pattern diagram, the monomials $E_p(\chi)$ are bit trains with just one of the 40 bits being "1" and the remainder all being "0", with the "1" bit differing in bit position. In the figure, the "1" bits are arranged in a line slanting from the top left to the bottom right. The remainders $R(\chi)$'s obtained by dividing the values of the $E_p(\chi)$'s corresponding to $\chi^{39}, \chi^{38} \ldots \chi^{00}$, by the generator polynomial $G(\chi)$ become the 8-bit bit trains shown in the right column of the figure. For example, for the term of $X^{39}$, the remainder is:

00110001

From the term of $X^{39}$, wiring is provided to the input gates 53 corresponding to the three bit positions having "1" bits among the above-mentioned eight bits (00110001). In FIG. 21, it will be seen that wiring is provided to $\chi^5$ and $\chi^0$ from $C_{39}$ (illustration omitted for $\chi^4$). Further, for example, for the term of $\chi^{38}$, the remainder is: From the term of $\chi^{28}$, wiring is provided to the input gates 53 corresponding to the five bit positions having "1" bits among the above-mentioned eight bits (10011011). In FIG. 21, it will be seen that wiring is provided to $\chi^7$ and $\chi^0$ from $C_{38}$ (illustration omitted for $\chi^1$, $\chi^3$, and $\chi^4$, ), The horizontally extending wiring group and the parity check circuits (PC) receiving inputs in the wired logic unit 51 in FIG. 21 are used to perform an operation equivalent to the addition of the bit trains in the right column of FIG. 22 in the lateral direction with the bit positions (j bits) matched and to obtain the desired remainder $R(\chi)$.

Figure 23:
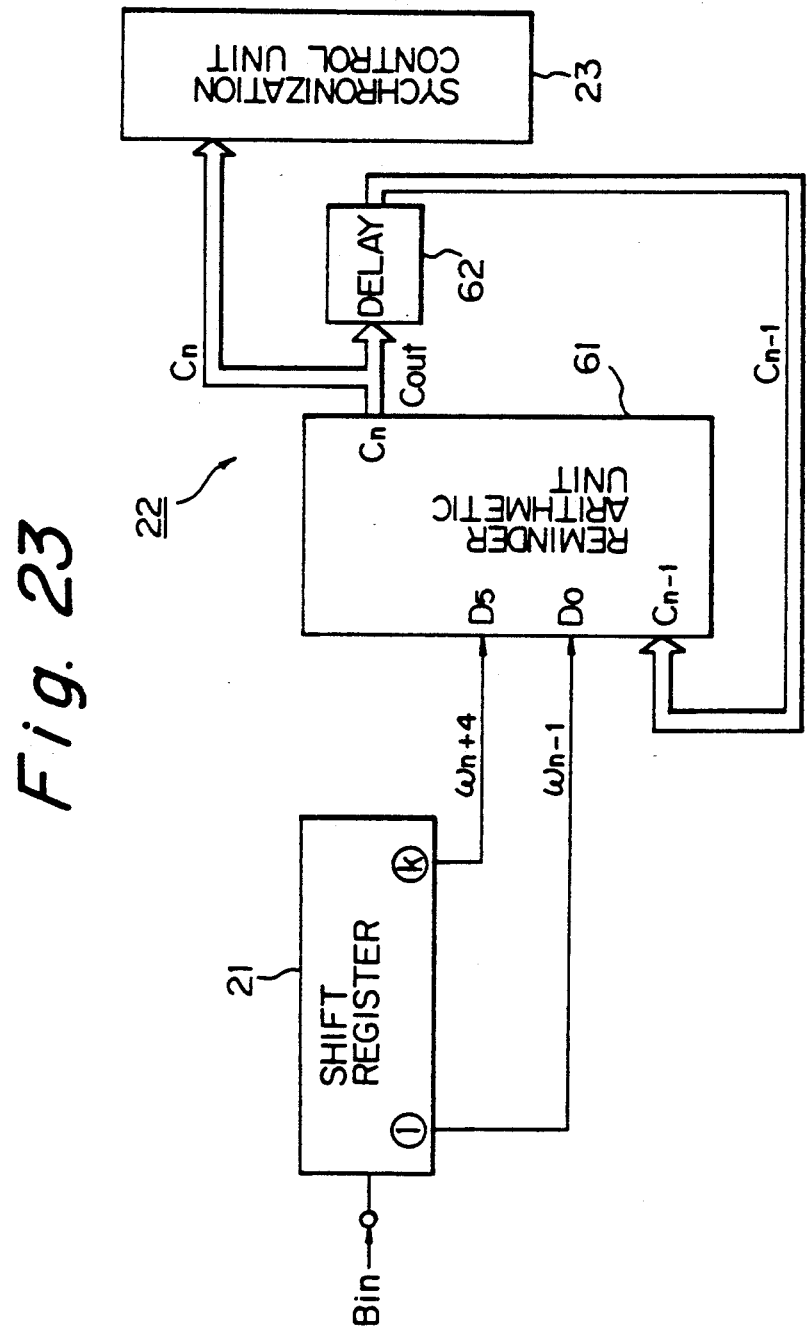
FIG. 23 is a view of a fourth embodiment of the present invention.

FIG. 23 is a block diagram of a fourth embodiment of the present invention. In FIG. 23, the continuous CRC arithmetic unit 22 includes a remainder arithmetic unit 61 and a delay unit 62. Further, the shift register unit 21 is a k-stage shift register. The number k is larger than 1 and smaller than the number of bits (for example, 8) making up one octet of the ATM cell. The bit output of the first stage of the k-stage shift register 21 and the bit output of the k-th stage form two of the three inputs used for the CRC arithmetic operation in the remainder arithmetic unit 61. The remaining one input is the output from the delay unit 62. From the remainder arithmetic unit 61 is output the CRC arithmetic operation results $C_{out}$ successively and continuously in accordance with the shifting timing. This $C_{out}$ is on the one hand output to the synchronization control unit 23 in the same way as the previously mentioned embodiment and on the other hand is output to the delay unit 62. Therefore, what is supplied from the delay unit 62 to the input of the remainder arithmetic unit 61 is the CRC arithmetic operation result obtained just before.

Therefore, the remainder arithmetic unit 61 executes the predetermined operation receiving these three inputs and produces the CRC arithmetic operation result $C_{out}$.

The fourth embodiment is established taking note of a certain mathematical method which will be explained below. First, see FIG. 24.

Figure 24:
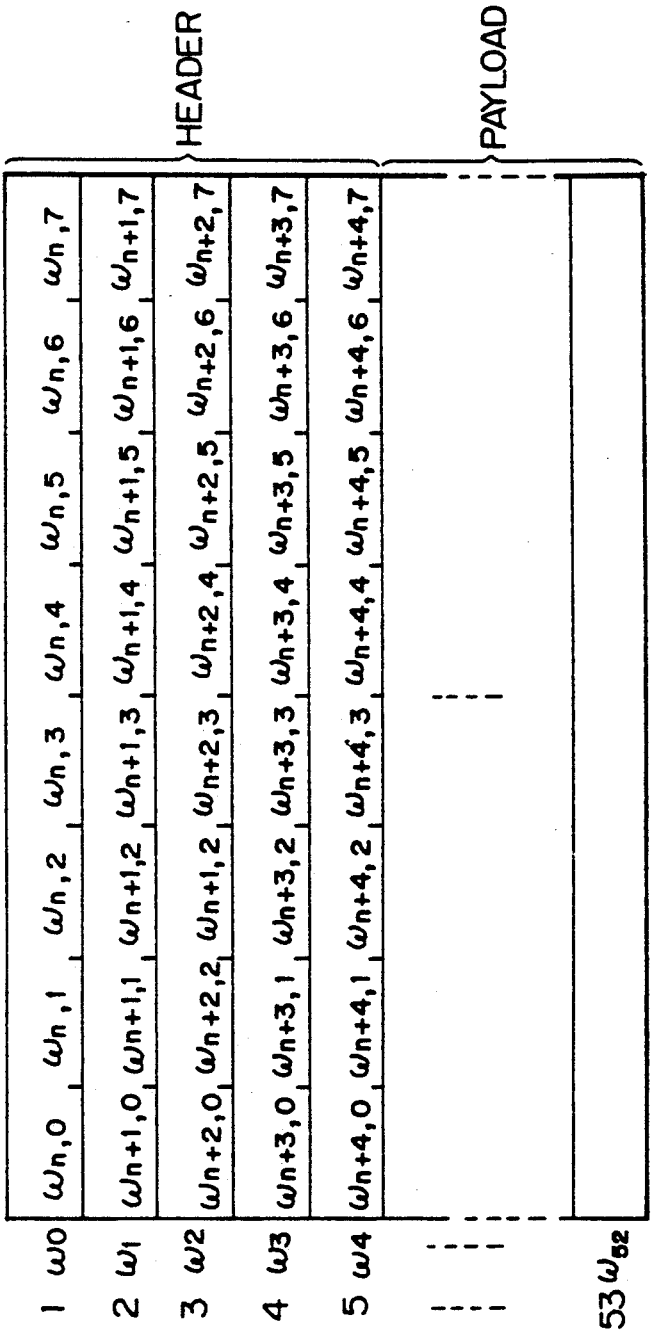
FIG. 24 is a view of the general format of the ATM cell used for explaining the fourth embodiment.

FIG. 24 is a view of the general format of the ATM cell used for explaining the fourth embodiment. FIG. 24 shows the ATM cell shown in FIG. 9 with the header data in bit units. The following explanation will be made in terms of these bit units.

If the time series in the input bit train $B_{in}$ is taken out and made W, is a numeral series expressed by eight factors:

$$W: \ldots \omega_{n-1}\, \omega_n\, \omega_{n+1}\, \omega_{n+2}\, \omega_{n+3}\, \omega_{n+4}\, \omega_{n+5} \ldots$$

$\omega_n$ is a numeral series expressed by eight factors:

$$\omega_{n0}\, \omega_{n1}\, \omega_{n2}\, \omega_{n3}\, \omega_{n4}\, \omega_{n5}\, \omega_{n6}\, \omega_7$$

That is, if $w_n$ is expressed by a polynomial, the result is:

$$\omega_n = \omega_{n0}\chi^7 + \omega_{n1}\chi^6 + \omega_{n2}\chi^5 + \ldots + \omega_{n7}\chi^0 \tag{24}$$

Here, in the above-mentioned time series W, when five octets corresponding to the header of the ATM cell, that is, $w_n + \omega_{n+4}$ are taken out, the CRC arithmetic operation result $C_{out}$ is $C_n$. Further, the generator polynomial used for the CRC arithmetic operation is G. Then the CRC calculation result $C_n$ is expressed by $$C_n = (F_n) \bmod(G) \tag{25}$$

that is, the remainder obtained by dividing $F_n$ by G. Here, $F_n$ is expressed by the polynomial shown in the following equation:

$$\begin{aligned} F_n &= \omega_n \chi^{8 \times 4} + \omega_{n+1}\chi^{8 \times 3} + \ldots + \omega_{n+4}\chi^{8 \times 0} \\ &= Q_n \cdot G + C_n \ (Q_n \text{ is the quotient}) \end{aligned} \tag{26}$$

In equation (26), $\omega_n \chi^{8x4}$ corresponds to the first octet, $\omega_{n+1}\chi^{8x3}$ corresponds to the second octet, ... and $\omega_{n+4}\chi^{8x0}$ corresponds to the fifth octet.

Here, if a mathematical inductive method is used and considered given to the $C_{n+1}$ appearing at the timing following $C_n$, then $C_{n+1}$ can be expressed as follows:

$$\begin{aligned} C_{n+1} &= (F_{n+1}) \bmod(G) \\ &= (F_n\chi^8 - \omega_n\chi^{8 \times 5} + \omega_{n+5}\chi^{8 \times 0}) \bmod(G) \\ &= \{(Q_n \cdot G + C_n)\chi^8 - \omega_n\chi^{8 \times 5} + \omega_{n+5}\chi^{8 \times 0}\} \bmod(G) \\ &= (C_n\chi^8) \bmod(G) - (\omega_n\chi^{8 \times 5}) \bmod(G) + \omega_{n+5}\chi^{8 \times 0} \end{aligned} \tag{27}$$

Here, the following six initial conditions are set forth the equation (27):

$$\begin{aligned} C_{-5} &= 0 \\ C_{-4} &= \omega_0 \\ C_{-3} &= (\omega_0\chi^8 + \omega_1) \bmod(G) \\ C_{-2} &= (\omega_0\chi^{8 \times 2} + \omega_1\chi^8 + \omega_2) \bmod(G) \\ C_{-1} &= (\omega_0\chi^{8 \times 3} + \omega_1\chi^{8 \times 2} + \omega_2\chi^8 + \omega_3) \bmod(G) \\ \omega_4 &= \omega_3 = \omega_2 = \omega_1 = 0 \end{aligned}$$

If the above initial conditions are set in the equation (27), the CRC arithmetic operation result $C_n$ is expressed by the following equation:

$$C_n = (C_{n-1}\chi^8) \bmod(G) - (\omega_{n-1}\chi^{8x5}) \bmod(G) + \omega_{n+4}\chi^{8x0} \quad (28)$$

As clear from the final conclusion, that is, the above equation (28), the CRC arithmetic operation results $C_n$ sought can be expressed extremely simply using the three elements $C_{n-1}$, $\omega_{n-1}$ and $\omega_{n+4}$. These three elements, however, are coefficients of $\chi^8$, $\chi^{8x5}$, and $\chi^{8x0}$ and occur at different times from each other, so when the remainder arithmetic unit 61 executes the arithmetic operations on the three elements, the three elements must be obtained at the same timing at the input of the remainder arithmetic unit 61. The k-stage shift register 21 and delay unit 62 shown in FIG. 23 exist for matching the above timings. Note that the three elements $C_{n-1}$, $\omega_{n-1}$ and $\omega_{n+4}$ shown in the above-mentioned equation (28) appear at the portions shown in FIG. 23.

Figure 25:
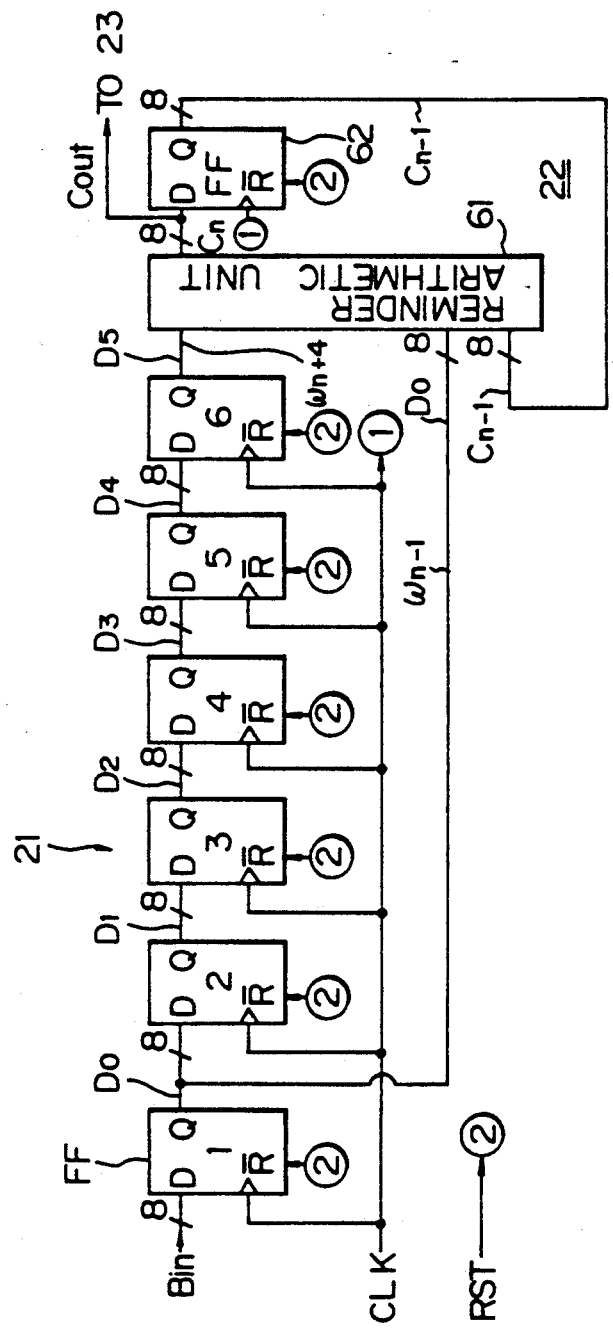
FIG. 25 is a view of a detailed example of the fourth embodiment.

FIG. 25 is a view of an example of realization of the fourth embodiment. In the figure, the k-stage shift register 21 is comprised of a 6-stage shift register (comprised of six flipflops FF connected in tandem). The above-mentioned element $\omega_{n+4}$ is supplied from the first stage output receiving the input bit train $B_{in}$, while the above-mentioned element $\omega_{n-1}$ is supplied from the sixth stage output. These are applied to the remainder arithmetic unit 61. The other element $C_{n-1}$ to be input to the remainder arithmetic unit 61 is given from the delay unit 62. This may be comprised of a D-flipflop DFF as illustrated. The clock signal CLK defining the overall timing is, for example, a speed of 4M. The bit outputs $D_0$, $D_1 \ldots D_5$ are sent out from these FF's in synchronization with this clock signal CLK. Further, the reset signal RST is given to the reset inputs of the FF's. The reset signal RST rises at the same time as the reception of the input bit train $B_{in}$ (see FIG. 26) and falls when the reception of $B_{in}$ is completed.

Figure 26:
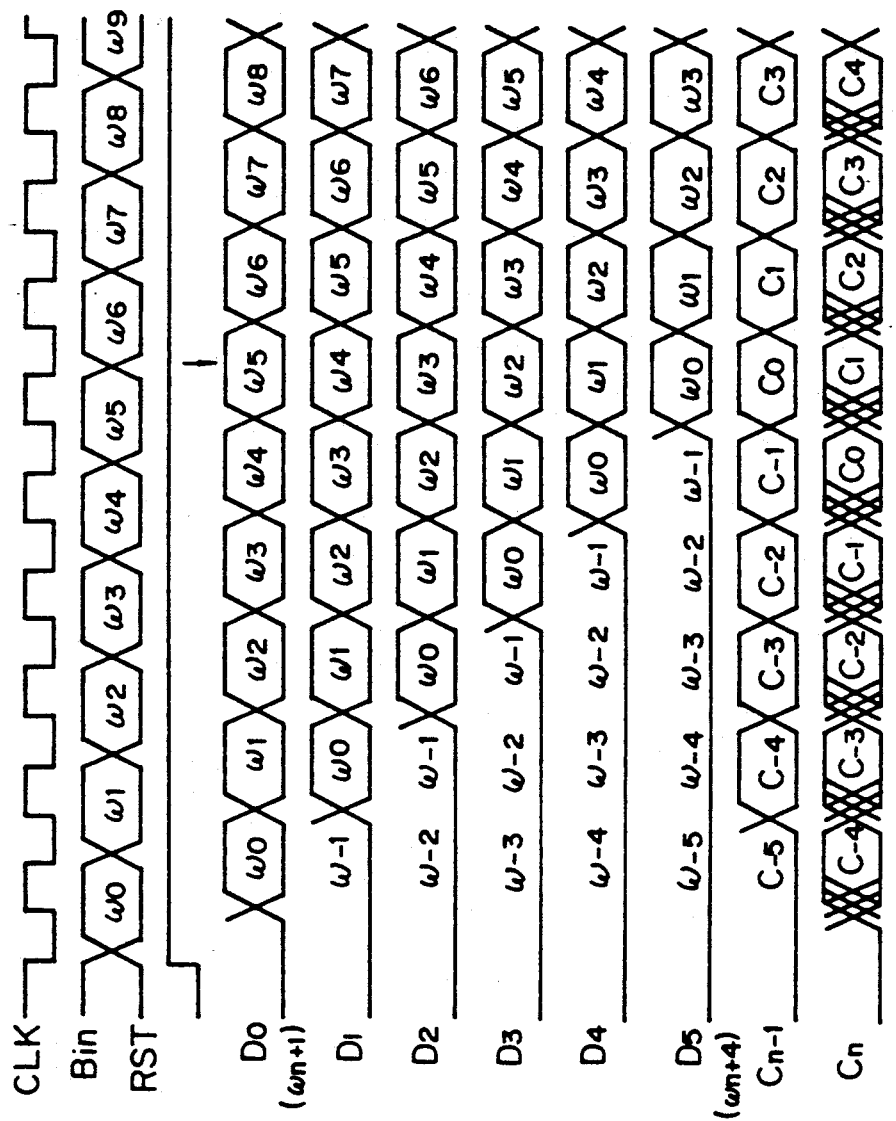
FIG. 26 is a timing chart of signals appearing at key portions of FIG. 25.

FIG. 26 is a timing chart of signals appearing at key portions of FIG. 25. In the figure, the same references (CLK, $B_{in}$ ...) are given to the rows corresponding to the signals of FIG. 25. The downward facing arrow $B_{in}$ in the row of $D_0$ shows that the above-mentioned three elements ($w_{n-1}$, $\omega_{n+4}$, $C_{n-1}$) are matched at the same time as $\omega_0$, $\omega_5$, and $C_0$ for the first time since being input. The CRC arithmetic operation results sought are $C_1$.

Next, a detailed explanation will be given of the remainder arithmetic unit 61 in FIG. 25.

Figure 27:
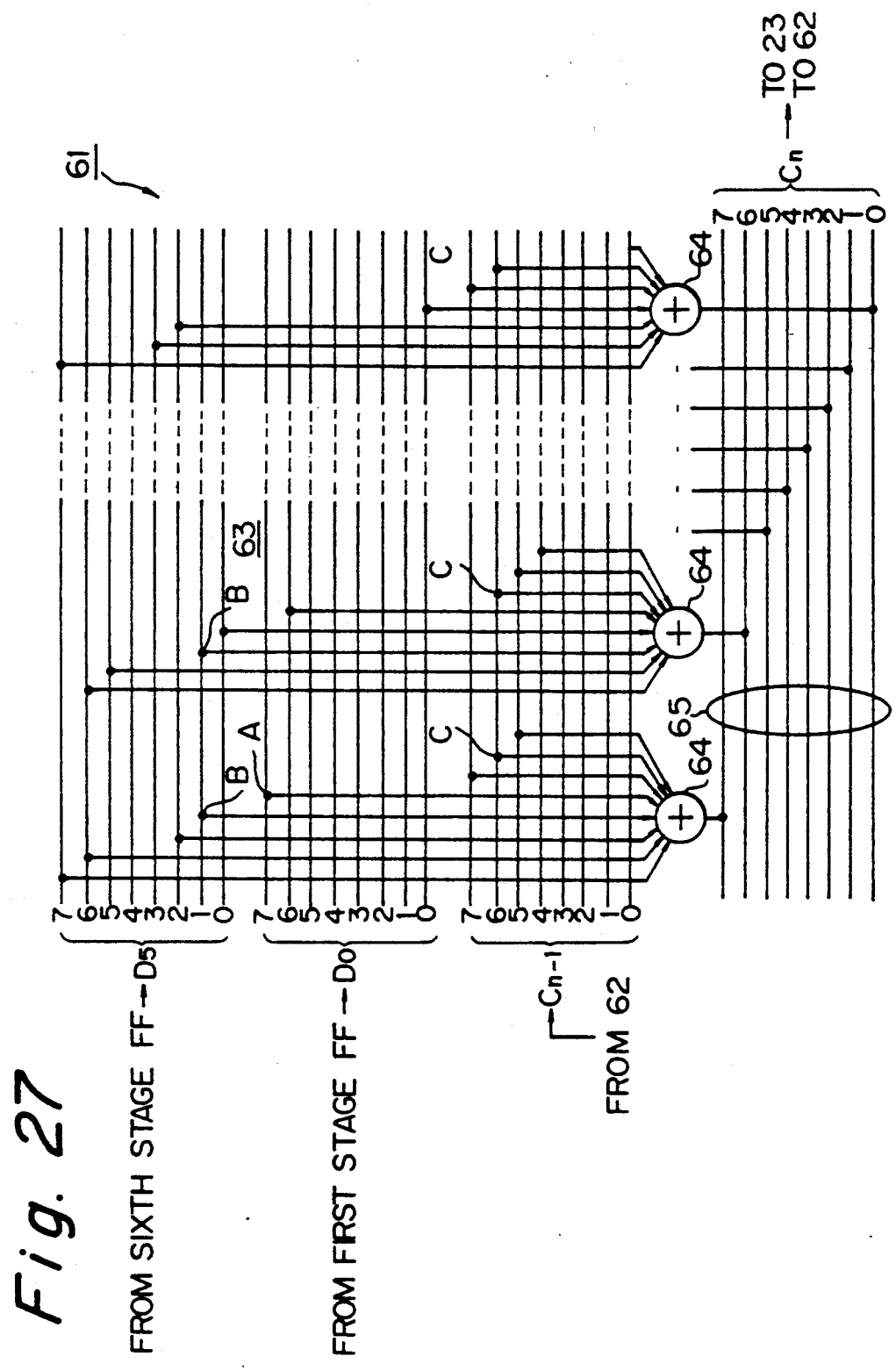
FIG. 27 is a view of a detailed example of a remainder arithmetic unit.

FIG. 27 is a view of a detailed example of a remainder arithmetic unit. In FIG. 27, the remainder arithmetic unit 61 is comprised, for example, of the illustrated wired logic unit 63, the EX-OR gate 64, and 8-bit leading wires 65 for output of the CRC arithmetic operation results. The wired logic unit 63 receives at the input side the above-mentioned three elements $\omega_{n-1}$, $\omega_{n+4}$, and $C_{n-1}$ as the bit outputs $D_0$ and $D_5$ of the 6-stage shift register 21 and the output of the delay unit 62 and is connected at the output side to eight EX-OR gates 64 (only three shown) corresponding to the eight bits. The wired logic unit 63 is assembled as shown in FIG. 27 for a similar reason as to why the wired logic unit 51 is assembled as shown in FIG. 21 in the above-mentioned third embodiment. That is, the CRC arithmetic operation results for the input $D_5$ and $D_0$ and $C_{n-1}$ in FIG. 27 can be calculated in advance (see row $R(\chi)$ in FIG. 22), so this is used for wiring the wired logic unit 61.

FIG. 28 is a view of the bit pattern for constituting the portion corresponding to the bit output $D_0$ in the wired logic unit of FIG. 27, FIG. 29 is a view of the bit pattern for constituting the portion corresponding to the bit output $D_5$ in the wired logic unit of FIG. 27; and FIG. 30 is a view of the bit pattern for constituting the portion corresponding to the immediately preceding CRC arithmetic operation result $C_{n-1}$ in the wired logic unit of FIG. 27.

Regarding $D_0$ of FIG. 28, for example, the line connection corresponding to the "1" bit in the bit train of the order $\psi^7$ becomes the connection point A of the $D_0$ row in FIG. 27. Further, for $D_5$ of FIG. 29, for example, the line connection corresponding to the "1" bit in the bit train of the order $\chi^7$ (only the two consecutive bits on the left side shown) becomes the connection point B of the $D_5$ row of FIG. 27. Further, for $C_{n-1}$ of FIG. 30, for example, the line connection corresponding to the "1" bit in the bit train of the order $\chi^{14}$ (only the two consecutive bits of the left side and the one bit of the right side shown) becomes the connection point C of the row $C_{n-1}$ of FIG. 27. After this line connection, connection is made to the corresponding inputs of the EX-OR gate 64 made into bundles of eight corresponding to the 8 bits of the $C_n$. The EX-OR gate performs an addition function and the results of the addition are sent out as Cn to the leading wires 65 corresponding to the bits.

When the synchronization circuit (20 in FIG. 8) is actually used in an ATM communication system, the synchronization circuit provided at the side receiving the ATM cells must function to provide rear protection and front protection as well. That is, the synchronization control unit (23 in FIG. 8) must include a rear protection and front protection means. Usually, rear protection is provided seven times and front protection six times.

Even if cell synchronization is detected for the first time by the above-mentioned CRC arithmetic operation from the header of the ATM cells begun to be received, it is not known if that true cell synchronization is detected. Therefore, if similar cell synchronization is detected continuously seven times, it is deemed that true cell synchronization has been detected and the synchronization detection signal ($S_d$ in FIG. 8) is started to be supplied. This is what is meant by seven times of rear protection.

Once cell synchronization has been established, cell synchronization is continued to be detected during the usual reception of data, but the synchronization detection signal $S_d$ is not always normally received. Cases when the $S_d$ is not received include cases where the cell synchronization is lost and $S_d$ is not obtained and cases where the synchronization detection signal should be obtained, but noise or the like causes the synchronization detection signal to be not received in actuality. In the former case, the reception of data is immediately suspended and cell synchronization must be detected again. In the latter case, however, there is no need for this. This is because the data can continue to be normally received under these conditions. Therefore, once cell synchronization has been established, it is deemed that cell synchronization has really been lost only when cell synchronization cannot be detected six successive times, in which case the supply of the synchronization detection signal $S_d$ is stopped. This is what is meant by six times of front protection. Therefore, the synchronization circuit 20 of the present invention is preferably provided with a rear protection and front protection function.

Figure 31:
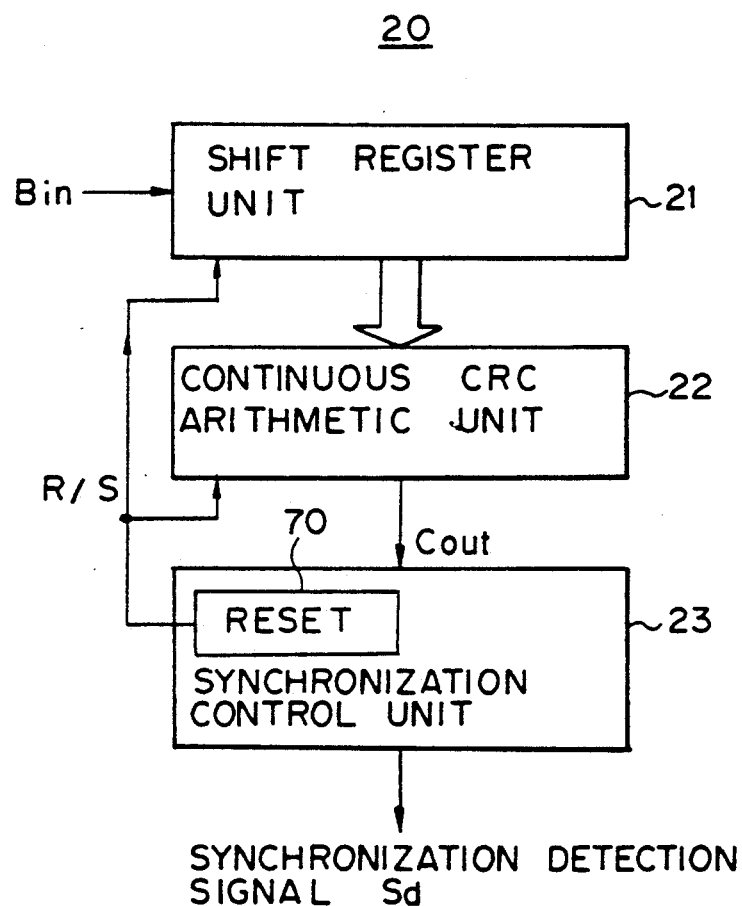
FIG. 31 is a block diagram of a synchronization circuit including a reset means.

FIG. 31 is a block diagram of the principle of a synchronization circuit including a reset means. The synchronization circuit 20 in FIG. 31 is provided with a reset means 70 at the synchronization control unit 23 at the reception side. The reset signal R/S from the reset means 70 is applied to the shift register unit 21 and the continuous CRC arithmetic unit 22.

Figure 32:
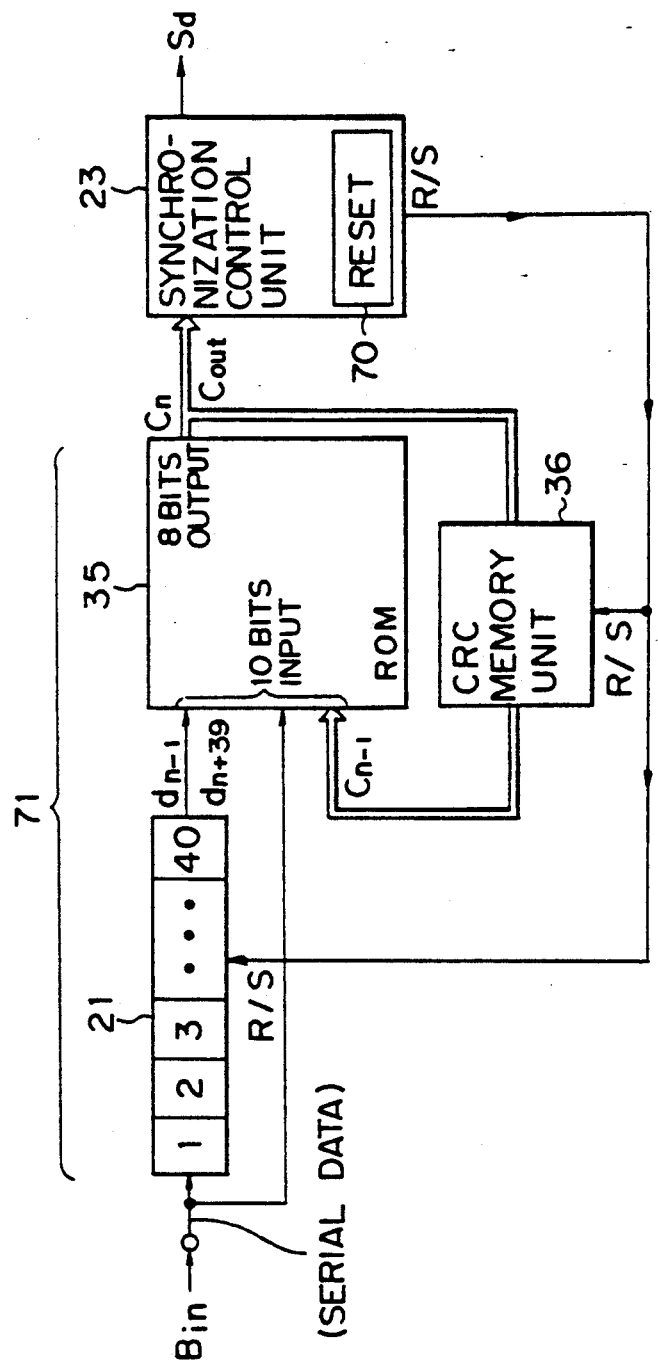
FIG. 32 is a view of an example of application of the reset means to the synchronization circuit of FIG. 14.

According to the CCITT recommendations, once cell synchronization has been established, it is possible to predict the timing at which the next synchronization detection is possible, so during that period the synchronization detection operation may be suspended. In accordance with this, the rear protection function and the front protection function can be started up at cycles of 53 bytes (53 octets). In this case, the synchronization circuit of the present invention would not function with just the synchronization detection started up every 53 bytes. This is because the synchronization circuit 20 has the shift register 21 with the data holding function and the CRC arithmetic unit 22 (CRC memory unit 36 and delay unit 62). That is, it is necessary to reset the past data remaining in the data holding function unit. Therefore, the reset means 70 is provided. This reset means 70 is essential for performing the rear protection and front protection. A detailed example will be provided below:

FIG. 32 is a view of an example of application of the reset means to the synchronization circuit of FIG. 14. The operation in the figure is as follows: Here, the ROM has written in it the results of calculation of the $C_{n+1}$ from a $a_{n+40}$, and $C_n$ in advance.

(i) When $n=-39$ (initial state)

The synchronization control unit 23 sends the reset signal R to the CRC arithmetic processing unit 71. This resets the internal states of the shift register 21 and the CRC memory unit 36 in the CRC arithmetic processing unit (ii) When $n=-38$ The initial data a is input in the LSB of the shift register 21 and the ROM 35. At this time, at the shift register 21, the data is shifted in the direction from the LSB to the MSB (right direction in the figure). Further, at this time, simultaneously the CRC arithmetic operation result of the state just before (initial state), that is, the all "0" state, from the CRC memory unit 36 and, further, the "0" from the MSB of the shift register are input. In this state, the next CRC arithmetic operation result is read from the ROM 35 and is set in the CRC memory unit 36.

At this time, data of the number of bits sufficient for performing the desired CRC arithmetic operation is not input to the CRC arithmetic processing unit 71, so the synchronization control unit 23 does nothing.

(iii) When $-37 \leq n \leq 0$

The data $a_{n+39}$ is input to the LSB of the shift register 21 and the ROM 35. At this time, in the shift register, the data is shifted in the direction from the LSB to the MSB (right direction in the figure). Further, at this time, simultaneously the CRC arithmetic operation result of the state just before (initial state) from the CRC memory unit 36 and, further, the "0" from the MSB of the shift register are input. In this state, the next CRC arithmetic operation result is read from the ROM 35 and is set in the CRC memory unit 36.

At this time, data of the number of bits sufficient for performing the described CRC arithmetic operation is not input to the CRC arithmetic processing unit 71, so the synchronization control unit 23 does nothing.

(iv) When $n=1$

The data are is input to the LSB of the shift register 21 and the ROM 35. At this time, in the shift register, the data is shifted in the direction from the LSB to the MSB (right direction in the figure). Further, at this time, simultaneously the CRC arithmetic operation result of the state just before (initial state) from the CRC memory unit 36 and, further, the "0" from the MSB of the shift register are input. In this state, the next CRC arithmetic operation result is read from the ROM 35 and is set in the CRC memory unit 36.

Data of the number of bits sufficient for performing the desired CRC arithmetic operation is input to the CRC arithmetic processing unit 71, so the synchronization control unit 23 waits until the desired CRC arithmetic operation results become synchronized.

(v) When $n \geq 2$

The data $a_{n+39}$ is input to the LSB of the shift register and the ROM 35. At this time, in the shift register, the data is shifted in the direction from the LSB to the MSB (right direction in the figure). Further, at this time, simultaneously the CRC arithmetic operation result of the state just before (initial state) from the CRC memory unit 36 and, further, the and from the MSB of the shift register are input. In this state, the next CRC arithmetic operation result is read from the ROM 35 and is set in the CRC memory unit 36.

Data of the number of bits sufficient for performing the desired CRC arithmetic operation is input to the CRC arithmetic processing unit 71, so the synchronization control unit 23 waits until the desired CRC arithmetic operation results becomes synchronized.

In the state after (vi) and (iv), the synchronization detection signal $S_d$ is output from the synchronization control unit 23 in the state where the conditions for front protection for synchronization have been met.

In the state after (vii) and (vi), when the desired CRC arithmetic operation results are not synchronized at the desired position, the set signal is output from the synchronization control unit 23. The CRC arithmetic processing unit is set to a state waiting for the same meaning as the internal state desired in the synchronization state (shift register all "0", CRC memory unit all "0").

In the state of (viii) and (vi), when loss of synchronization is detected, a reset signal is output from the synchronization control unit 23, the synchronization detection signal disappears, and the state (i) is returned to.

Figure 33:
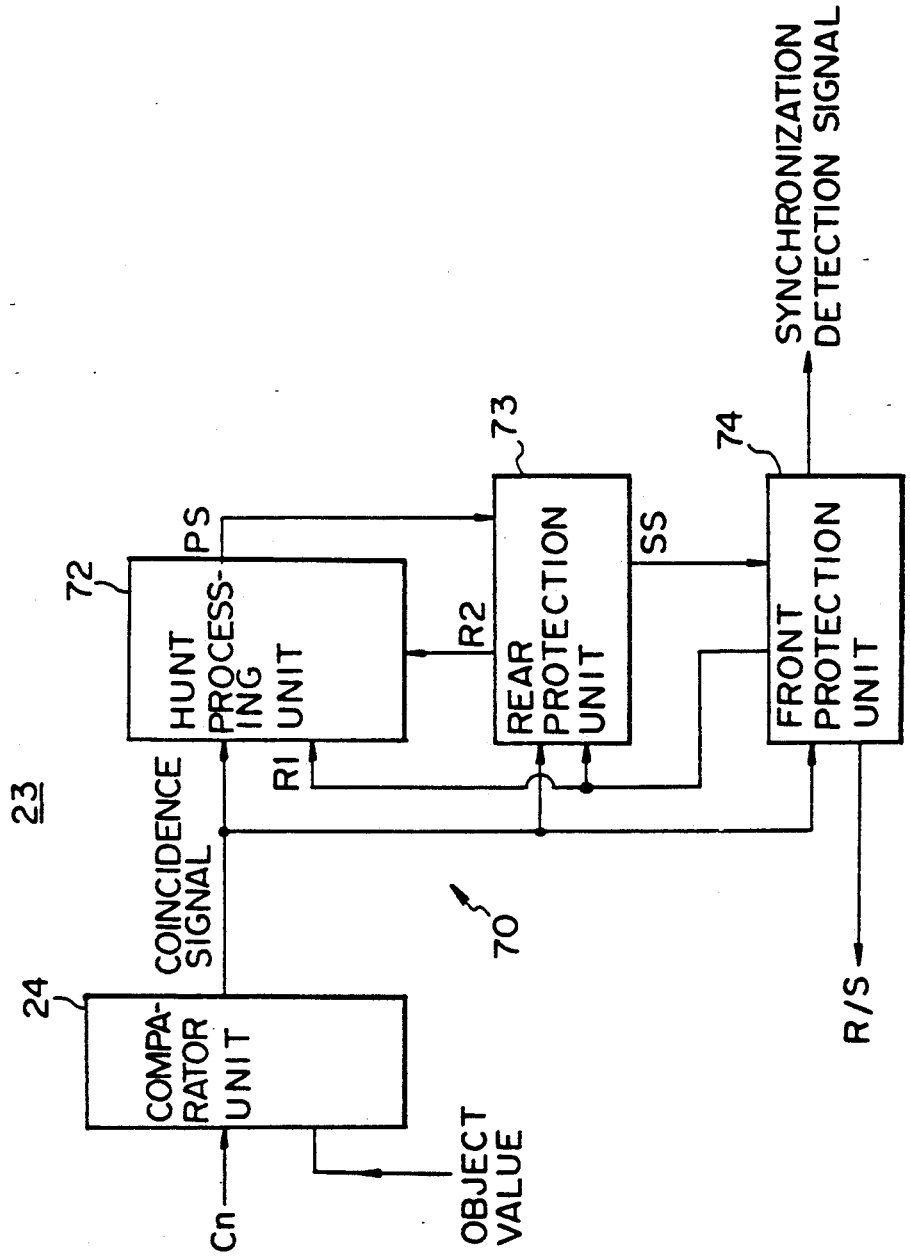
FIG. 33 is a view of an example of a synchronization control unit 23 in FIG. 32.

FIG. 33 is a view of an example of a synchronization control unit 23 in FIG. 32. This includes reset means 70.

Figure 34:
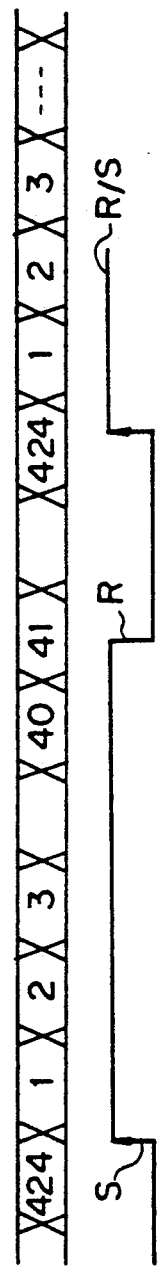
FIG. 34 is, a timing chart showing the reset signal in FIG. 33.

FIG. 34 is a timing chart showing the reset signal in FIG. 33. Reference characters 424 in FIG. 34 indicates 53 (all octets in ATM cell)×8 (bits) and 40 indicates 5 (all octets of header in ATM cell)×8 (bits). The reset signal R/S is output cyclically as illustrated and is output to the CRC arithmetic processing unit 7 (FIG. 32).

(1) Initial state

The hunt processing unit 72 is in a hunting state.

(2) Hunting state

When the reset of the master is released, the CRC arithmetic processing unit 71 starts the CRC arithmetic operation and $C_n$'s are successively input to the comparator unit 24.

In the comparator unit 24, when $C_n$ matches the desired value, the coincidence signal is output. At this time, the signal PS showing that the pseudo synchronization has started is output from the hunt processing unit 72, and the rear protection operation is started at the rear protection unit 73.

(3) Rear protection state

The rear protection unit 73 which starts the rear protection operation checks that the coincidence signal is received successively seven times for each 53 bytes from the point of time when the signal PS is input. At this time, the synchronization start signal SS is output to the front protection unit 74.

When seven successive coincidence signals cannot be received, the reset signals R2 and R/S are sent to the unit processing unit 72 and the CRC arithmetic processing unit 71 and the above-mentioned state (2) is returned to.

(4) Synchronization state

Continuing after the above-mentioned state (3), the synchronization state exists while the coincidence signal is input to the front protection unit 74 every 53 bytes.

(5) Front protection state

When the coincidence signal coming every 53 bytes stops, the front protection unit 74 enters the front protection state. At this time, just the synchronization detection signal Sd is output every 53 bytes. When the coincidence signal is not input for six successive times, the front protection unit 74 outputs the reset signals R1 and R/S and the above-mentioned state (1) is returned to. When the coincidence signal is once again input in the 53×i (i<6) byte, the above-mentioned state (4) is returned to.

Figure 35:
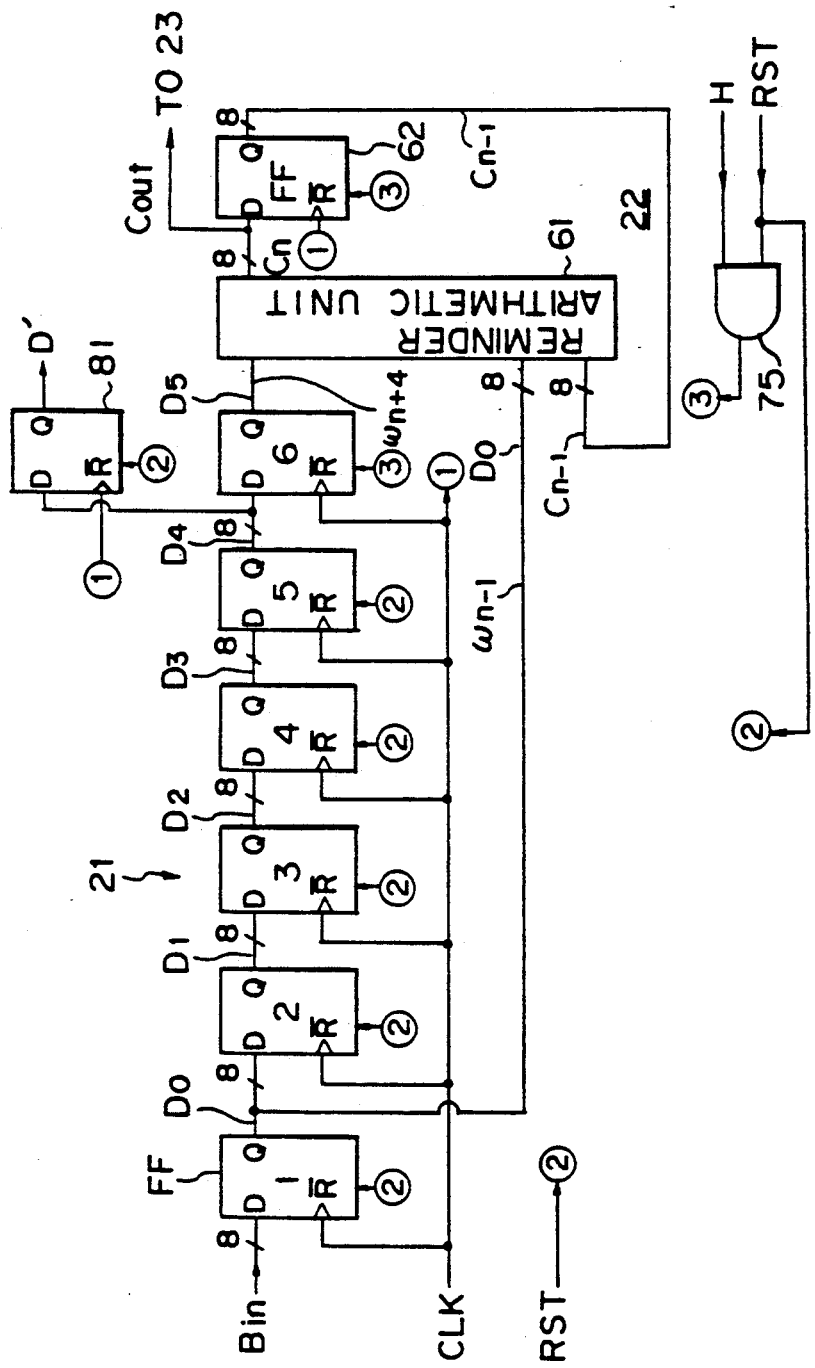
FIG. 35 is a view of an example of incorporation of the reset means in the circuit of FIG. 25.

FIG. 35 is a view of an example of incorporation of the reset means in the circuit of FIG. 25.

The reset means 70, in brief, executes the CRC arithmetic operation on the 5 octets from the header every 53 octets (length of one ATM cell) and is essential for the rear protection and front protection. A detailed example was given in FIG. 32.

The second detailed example shown in FIG. 35 has a reset means 70 built in the synchronization circuit of FIG. 25. The reset means 70 can be extremely easily realized by an AND gate 75. This is also an advantage of the synchronization circuit of FIG. 25.

The AND gate 75 receives as input the above-mentioned reset signal RST and the output H of a header counter (not shown) and outputs the reset signal R/S. The reset signal R/S is applied to the sixth stage flipflop FF of shift register 21 and the rest inputs of the flipflop forming the delay unit 62. Note that the above-mentioned header counter produces a cyclic output H synchronized with 53 octets. The waveform is shown in the row H of FIG. 36.

Figure 36:
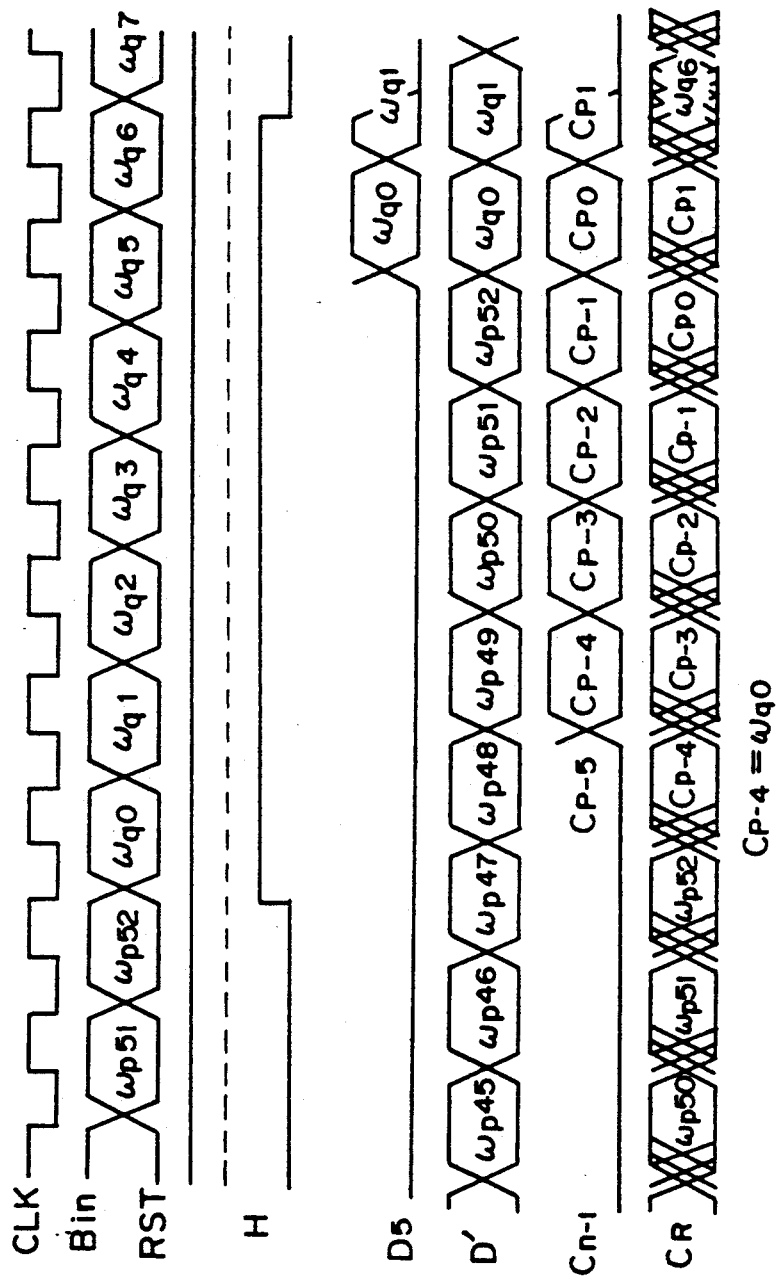
FIG. 36 is a timing chart of signals appearing at key portions of FIG. 35.

FIG. 36 is a timing chart of signals appearing at key portions of FIG. 35.

As mentioned in the beginning, the CRC arithmetic operation is used not only for the detection of cell synchronization, but also for correcting errors in the header itself of the ATM cells. Therefore, the synchronization control unit 23 in the synchronization circuit 20 is provided with header error correction means in addition to the above-mentioned reset means 70. Below, an example of header error correction means suitable for being incorporated in the synchronization control unit 23 is shown.

As mentioned above, the header error correction means enters the active state after the synchronization circuit enters the synchronization state through the above-mentioned rear protection. Strictly speaking, this is the synchronization state when there is no error in the header of the ATM cell appearing just before. Therefore, consider the definite time series $\psi$:

$$\psi_0 \; \psi_1 \; \psi_2 \; \psi_3 \; \psi_4$$

where $\psi_1$ is

Expressing this by a polynomial, the time series $\psi$ is a numerical equation expressed by:

$$\psi_1 = \psi_{i0} \chi^7 + \psi_{i1} \chi^6 + \chi_{i2} \chi^5 + \cdots \psi_{in} \chi^0 \quad (29)$$

Here, it is considered that the CRC arithmetic operation results C aimed at are C=0. That is, $$C = \psi \bmod(G) = 0 \quad (30)$$

However, assume that a one-bit error E enters the time series $\psi$. In this case, E is expressed by:

$$E = \chi^e \; (0 \leq e \leq 32)$$

$0 \leq e \leq 39$ refers to the range of 5 octets (5×8=40) of the header. This being so, the syndrome S (remainder) when a one-bit error E is included can be expressed by the following equation from equation (30):

$$\begin{aligned} S &= (\psi + E) \bmod(G) \quad (32) \\ &= \psi \bmod(G) + E \bmod(G) \\ &= E \bmod(G) \end{aligned}$$

since $\psi \bmod(G)$ is 0. Therefore, it becomes possible to calculate the syndrome S for correcting the one-bit error E. Here, if $$0 \leq e \; 7$$

that is, if there is a one-bit error in the eight bits 0 to 7, then $$S = E \bmod(G) = E \quad (33)$$

and the syndrome S coincides with the bit error E of the monomial.

On the other hand, analyzing the generator polynomial G, the general generator polynomial $G(=\chi^8 + \chi^2 + \chi^1)$ becomes $$G = (\chi + 1)(\chi^7 + \chi^6 + \chi^5 + \chi^4 + \chi^3 + \chi^2 + 1) \quad (34)$$

so the period becomes $\tau = 2^7 - 1 = 127$. Therefore, when the code length of the time series covered is deemed to be 127, if the bit train $(\psi + E)$ of the time series $\psi$ including the one-bit error E is cyclically replaced to the higher order side by i bits (i being a natural number less than 127), then $(\psi + E)$ becomes $(\psi + E)'$. Here, $(\psi + E)'$ can be rewritten to the following equation:

$$\begin{aligned} (\psi + E)' &= [\chi^i(\psi + E)] \bmod(\chi^{127} - 1) \quad (35) \\ &= (\chi^i \psi) \bmod(\chi^{127} - 1) + (\chi^i E) \bmod(\chi^{127} - 1) \end{aligned}$$

Therefore, the syndrome S' for this $(\psi + E)$, becomes:

$$\begin{aligned} S' &= [(\chi^i \psi) \bmod(\chi^{127} - 1) + (\chi^i E) \bmod(\chi^{127} - 1)] \bmod(G) \quad (36) \\ &= [(\chi^i E) \bmod(\chi^{127} - 1)] \bmod(G) \\ &= [(\chi^i E) \bmod(G) \\ &= \chi^{(i+e) \bmod(127)} \bmod(G) \end{aligned}$$

The term of $(\chi^i\psi)\bmod(\chi^{127}-1)$ in the above does not include an error, so is 0.

In equation (36), if the value i which gives $$0 \leq (i+e)\bmod(127) \leq 7$$

is selected, the syndrome S' can be simply found. That is, $$S' = \chi^{(i+3)\bmod(127)}$$

and error correction becomes possible.

Here, as a result, it is known that $$S' = (X^i S)\bmod(G)$$

so with respect to the syndrome S, the following is found:

$$S' = (\chi^{95+8\chi^m}S)\bmod(G) \quad \text{(where } m=0, 1, 2, 3, 4\text{)} \tag{38}$$

This becomes:

$$S' = (\chi^{95+8\chi m+e})\bmod(127)$$

where, $0 \leq (95+8m+e)\bmod(127) \leq 7$ (39)

and the error can be easily detected. Note that this is not applicable to a plurality of bit errors.

Next, the following are found:

$$S = C_{p0} \tag{40}$$
$$S_{-1} = (\chi^{87}S)\bmod(G) \tag{41}$$
$$S_i = (\chi^8 S_{i-1})\bmod(G) \quad (0 \leq i \leq 4) \tag{42}$$

Figure 38:
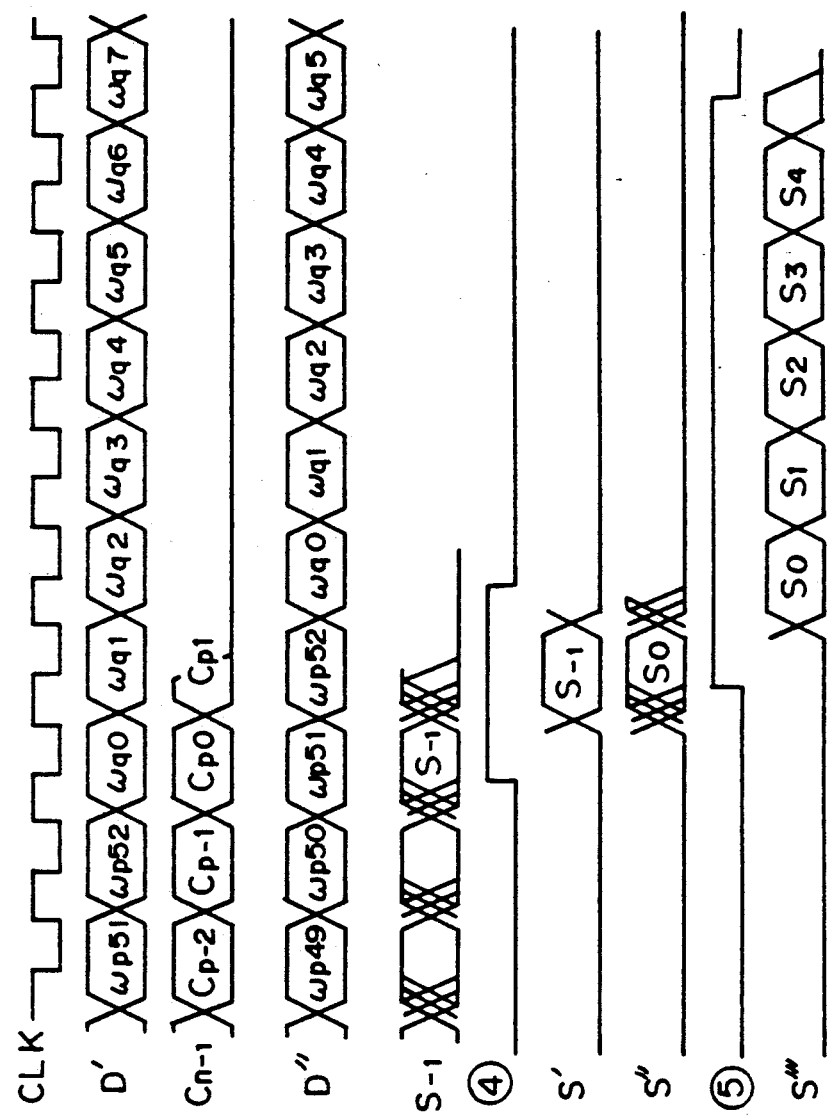
FIG. 38 is a timing chart of signals appearing at key portions of FIG. 37.

Note that $C_{p0}$ is shown in FIG. 38.

S in equation (40) shows the initial state of the data and may be illustrated as follows:

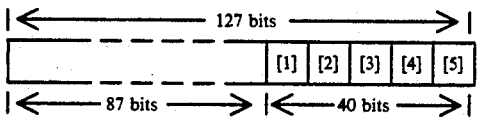

Note that [1] to [5] correspond to the first octet of the header of the ARM cell. Further, the code length is 127 bits.

The above-mentioned equation (41) indicates that the 87 bits of the header is in the S: of the above figure are moved to the right in the bit train. As a result, the header is cyclically replaced to the higher order side as shown by the following $S_{-1}$:

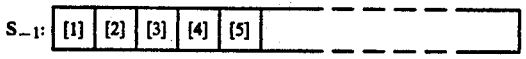

Next, if the first octet [1] of the header is moved to the right, the following $S_0$ is obtained. This $S_0$ has the i in the above equation (42) made i=0.

$$S_0 = (\chi^8 S_{-1})\bmod(G)$$

Below, similarly if another octet is moved to the right, $S_1$ becomes $$S_1 = (\chi^8 S_0)\bmod(G)$$

and can be expressed as the following $S_1$:

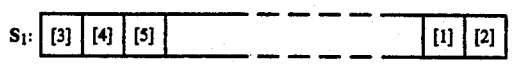

Therefore, finally the following results:
a) When S=0 (or S-1=0)→no error.
b) When $S_1 = \chi^j (0 \leq j \leq 7)$→the processing of $\omega_{i(7-j)} \leftarrow 1 + \omega_{i(7-j)}$ becomes necessary (bit inversion).
c) When $(0 \leq j \leq 4)$ and the condition in the previous two terms are not met→cell disposal is indicated.

Here, one of the error correction information a), b), and c) are obtained.

Figure 37:
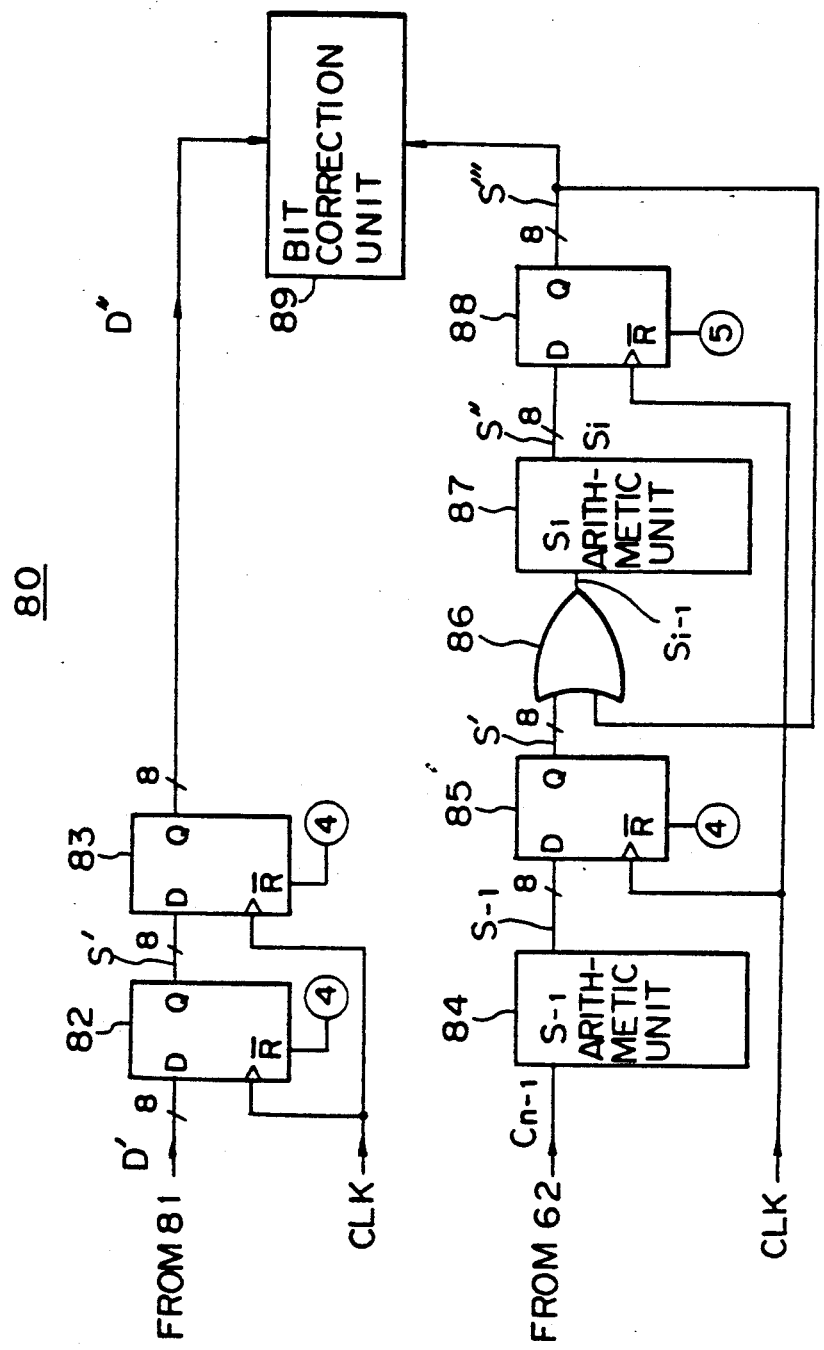
FIG. 37 is a view of a specific example of a header error correction means.

An example of the specific constitution of the header error correction means based on the above will be explained below:

FIG. 37 is a view of a specific example of the header error correction means. However, this is an example of application to the synchronization circuit shown in FIG. 35. Further, FIG. 38 is a timing chart of signals appearing at key portions of FIG. 37. The example Will be explained referring to these figures. First, in FIG. 37, the portion other than the bit correction unit 89 is the bit error detection unit. The bit error detection unit is comprised of the illustrated circuit elements 82 to 88. The flipflops 82, 83, 85, and 88 in the figure are mainly provided to match the timing and match with the timing of D" and S''' at the two inputs of the bit correction unit 89. Further, the $S_{-1}$ arithmetic unit 84 and the $S_i$ arithmetic unit 87 execute the bit shift mentioned above.

Figure 39:
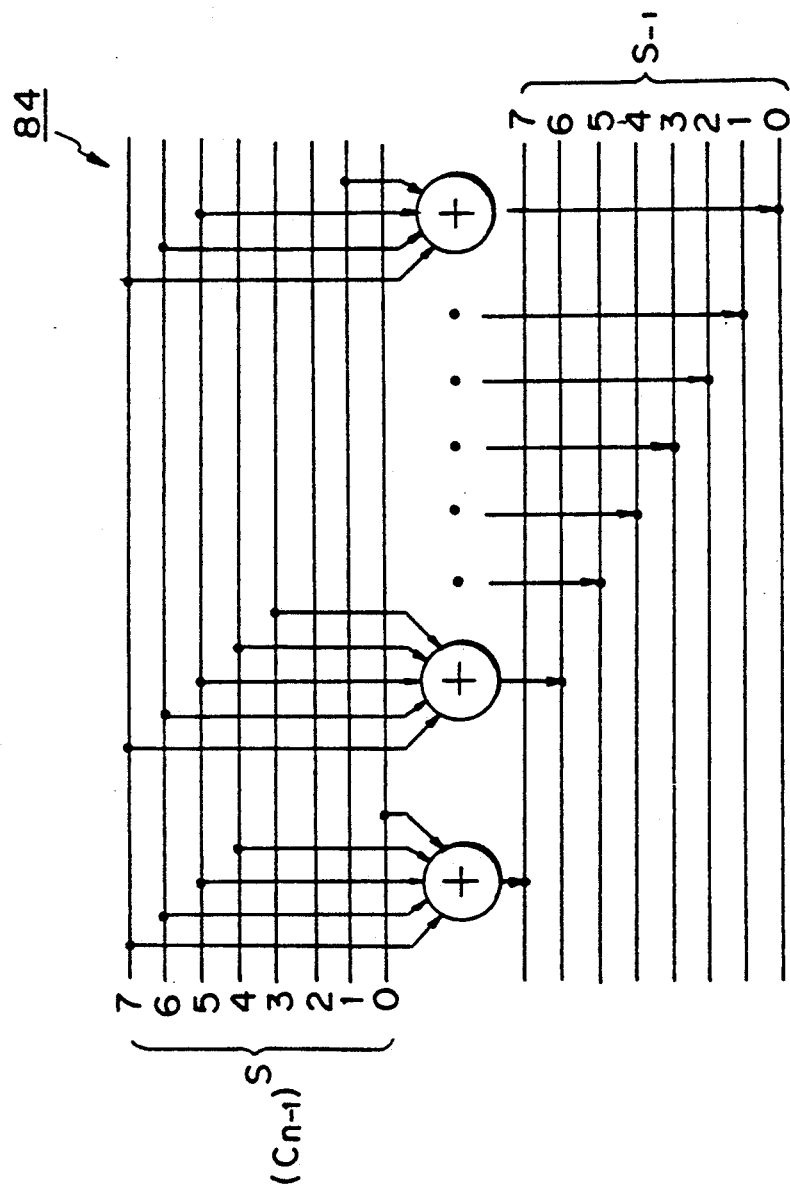
FIG. 39 is a view of an example of an $S_{-1}$ arithmetic unit in FIG. 37.
Figures 40, 41:
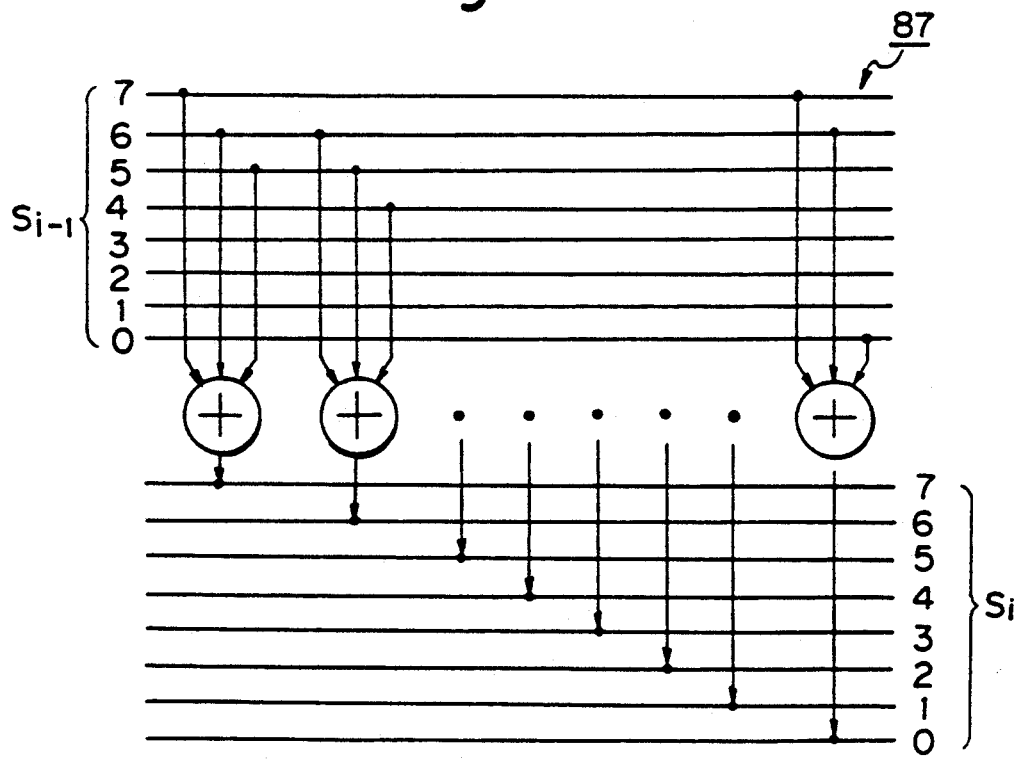
FIG. 40 is a view of the bit pattern for constituting the $S_{-1}$ arithmetic unit of FIG. 39.
FIG. 41 is a view of one example of the $S_1$ arithmetic unit in FIG. 37.

FIG. 39 is a view of an example of the $S_{-1}$ arithmetic unit in FIG. 37. FIG. 40 is a view of the bit pattern for constituting the $S_{-1}$ arithmetic unit of FIG. 39. FIG. 41 is a view of one example of the $S_1$ arithmetic unit in FIG. 37. FIG. 42 is a view of the bit pattern for constituting the $S_i$ arithmetic unit in FIG. 41.

Next, an explanation will be made of the bit correction unit 89 of FIG. 37.

Figure 43:
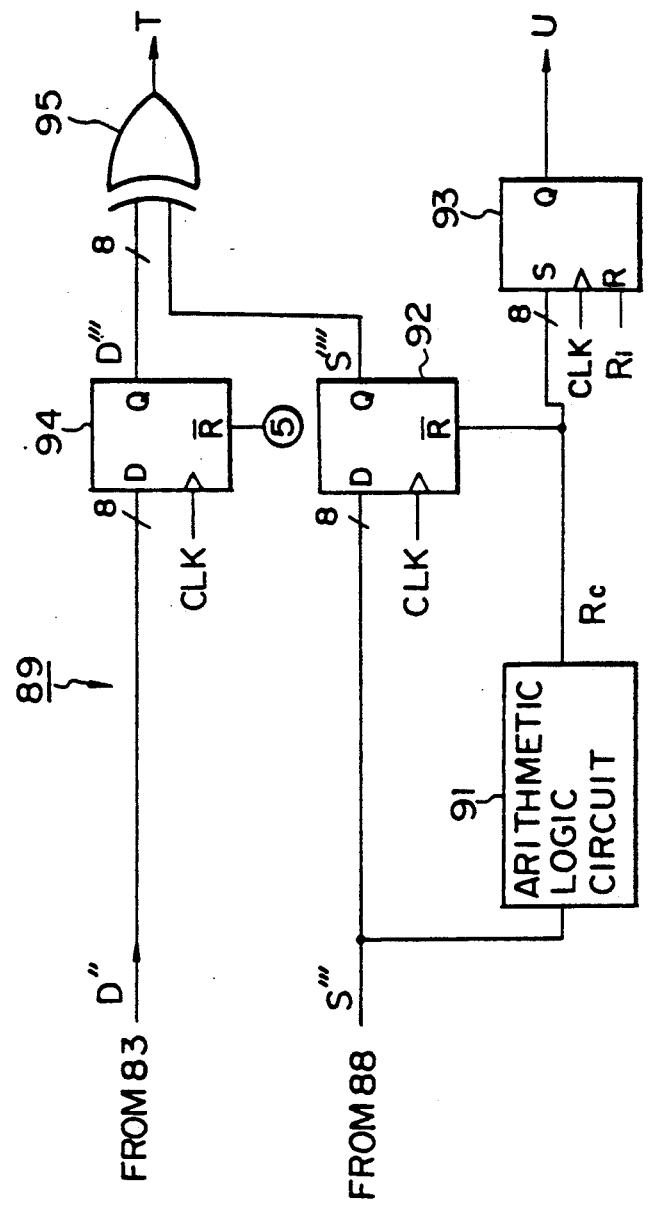
FIG. 43 is a view of an example of the bit correction unit of FIG. 37.
Figure 44:
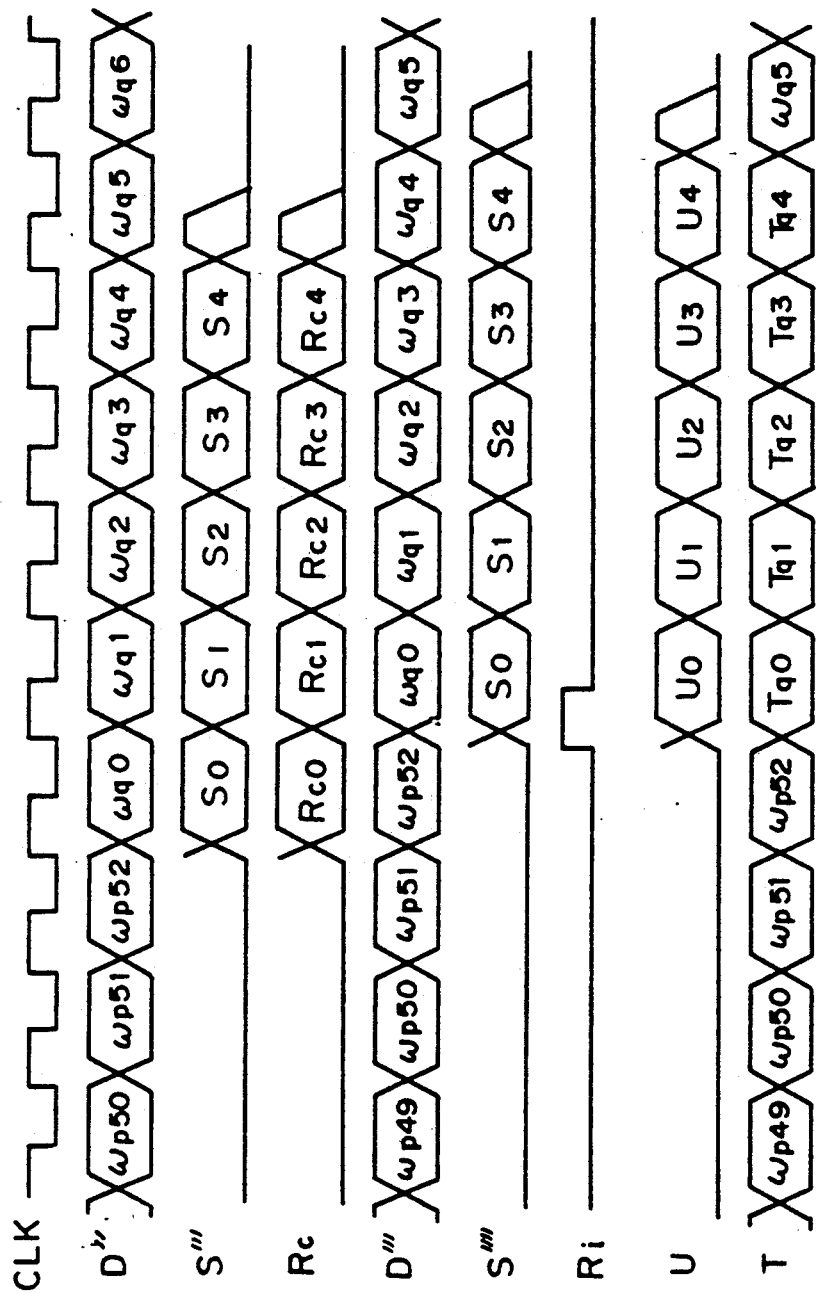
FIG. 44 is a timing chart of signals appearing at key portions of FIG. 43.

FIG. 43 is a view of an example of the bit correction unit of FIG. 37. FIG. 44 is a timing chart of signals appearing at key portions of FIG. 43.

In FIG. 43, 91 is an arithmetic circuit, 92 to 94 are flipflops, and 95 is an EX-OR gate. A header error is detected at the stage in front of the block 89 in FIG. 37. After this, the error is corrected by the bit correction unit 89 of FIG. 43 by the operation of FIG. 44. In the header error correction here, by obtaining the EX-OR E of the data when Si has a one-bit error and $\omega_i$ by the EX-OR gate 95, the corrected data bit T is obtained. Here, first, consideration will be given to the arithmetic circuit 91.

The arithmetic circuit 91
(i) outputs "1" when $S_i=0$ or when $S_i$ has a one-bit error and
(ii) outputs "0" when $S_i$ has two or more bits of error.

The construction of the arithmetic circuit 91 will be discussed later, but here note that the corrected data bit T is obtained by resetting the D-flipflop 92 by the output R of the circuit 91. This is because the EX-OR can be obtained only when $S_i=0$ or $S_i$ has a one-bit error.

On the other hand, looking at the RS flipflop 93, the Q output U
i) becomes "1" when $S_i=0$ or $S_i$ has a one-bit error and ii) becomes "0" when $S_i$ has two or more bits of error. Therefore, when $S_i$ includes two or more bits of error, $U_4$ still shows "0". At this time, the ATM cell is discarded. Note that the RS flipflop 93 is set by S1 showing the header of the ATM cell.

The above-mentioned arithmetic circuit 91 will be explained in further detail below. Here, assume that the $S_i$ mentioned above is expressed by $$S_i: S_{10} S_{11} S_{12} S_{13} S_{14} S_{15} S_{16} S_{17}$$

i) When $S_i = 0$ $$R_{ca} = S_{10} \cap S_{11} \cap S_{12} \cap S_{13} \cap S_{14} \cap S_{15} \cap S_{16} \cap S_{17} \quad (43)$$

becomes "1". $R_{ca}$ is the first result in the arithmetic circuit 91.

ii) When $S_i$ has a one-bit error $$R_{cb} = \overline{S_{10}} \cap S_{11} \cap S_{12} \cap S_{13} \cap S_{14} \cap S_{15} \cap S_{16} \cap S_{17} + \quad (44)$$
$$S_{10} \cap \overline{S_{11}} \cap S_{12} \cap S_{13} \cap S_{14} \cap S_{15} \cap S_{16} \cap S_{17} +$$

$$\vdots$$

$$S_{10} \cap S_{11} \cap S_{12} \cap S_{13} \cap S_{14} \cap S_{15} \cap S_{16} \cap \overline{S_{17}}$$

becomes "1". $R_{cb}$ is the second result in the arithmetic circuit 91.

Other than the above, there are two or more bits of error.

In the final analysis, the output $R_c$ of the arithmetic circuit 91 becomes the logical OR output of the above-mentioned $R_{ca}$ and $R_{cb}$.

The ATM cells are continuously sent in from the transmission side of the transmission channel. If this transmission channel is disconnected, the all "0" or all "1" data appears at the reception side. If the all "0" data appears, the CRC arithmetic operation result also becomes "0" and the reception side enters a state equivalent to one where synchronization is established. This is the pseudo synchronization detection state.

Therefore, it has been proposed at the CCITT that an offset bit train be mapped at the HEC region (HEC in FIG. 9) in the header of the ATM cells at the transmission side in advance. This offset bit train would, for example, be as follows:

01010101

To deal with the case of mapping of such an offset bit train, a logic inversion means is introduced in the present invention.

Figure 45:
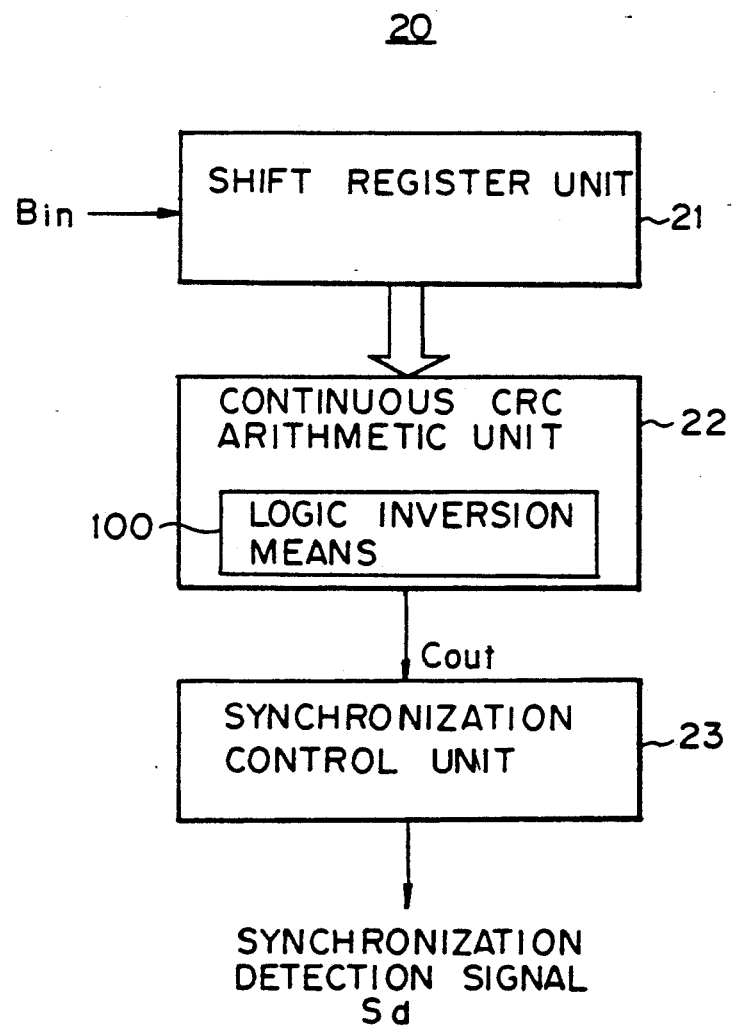
FIG. 45 is a block diagram of a synchronization circuit including a logic inverter.

FIG. 45 is a block diagram of the principle of a synchronization circuit including a logic inversion means. Reference numeral 100 in the figure is a logic inversion means. For "1", the bit corresponding to the CRC arithmetic operation result is inverted in logic. On the other hand, for "0", the bit corresponding to the CRC arithmetic operation result is passing with its logic as is. Showing this operation by a numerical equation, looking at the above-mentioned equation (17), $$R(\chi) = [C(\chi) + \text{offset}(\chi)] \bmod (G(\chi))$$

Figure 46:
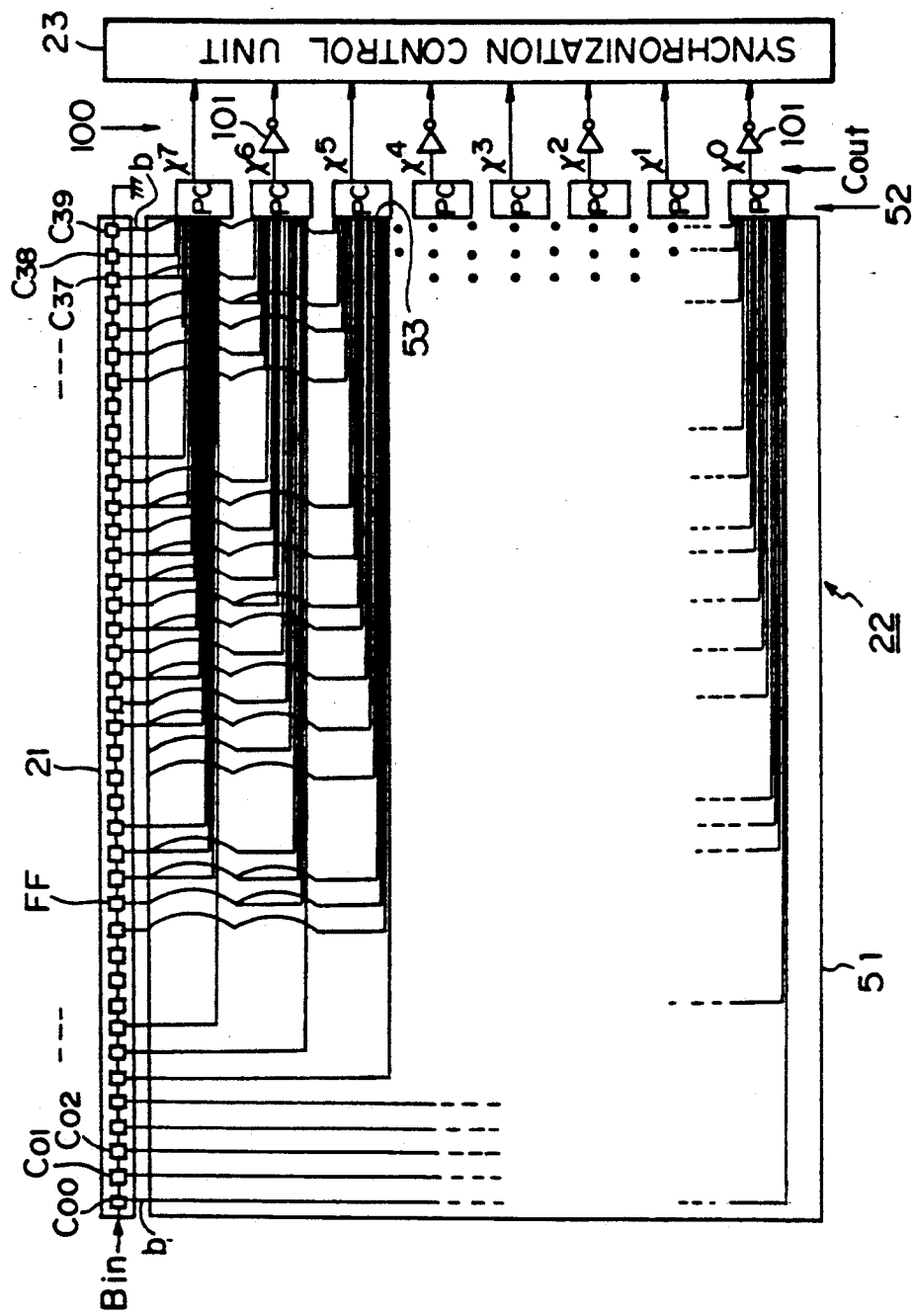
FIG. 46 is a view of an example of a logic inverter.

FIG. 46 is a view of an example of a logic inversion means. The logic inversion means 100 is applied to the continuous CRC arithmetic unit 22 of FIG. 21 (third embodiment). The logic inversion means of FIG. 45 is comprised of a group of invertors 101. The invertor 101 is connected at the bit position corresponding to "1" in the above-mentioned offset bit train. As explained above, according to the present invention, it is possible to perform a CRC arithmetic operation continuously on the header portion of bit trains of continuously input ATM cells and to detect synchronization at a high speed. Further, the hardware for this can be extremely simply realized based on a mathematical method.

We claim:

1. A synchronization circuit comprised of:
   a shift register unit which receives and holds in a bit serial manner input bit train constituting ATM cells used for data transmission and outputs delayed bit train;
   a continuous CRC arithmetic unit, operatively connected to receive the input bit train and to said shift register unit to receive the delayed bit train, to continuously perform a CRC operation in a bit serial manner using one bit from the delayed bit train and one bit from the input bit train to obtain a current CRC arithmetic operation result; and
   a synchronization control unit, operatively connected to receive the current CRC arithmetic operation result from said continuous CRC arithmetic unit, to output the CRC arithmetic operation result as a synchronization establishment signal in the ATM cells during transmission and to output a synchronization detection signal when the current CRC arithmetic operation result transmitted as the synchronization establishment signal and the CRC arithmetic operation result obtained upon receipt of the ARM cells match.

2. A synchronization circuit as set forth in claim 1, wherein said shift register unit is comprised of a shift register m bits long, where m is an integer greater than 1 and represents a number of bits covered by the CRC operation, and
   wherein said continuous CRC arithmetic unit is comprised of:
   a first CRC arithmetic unit, operatively connected to receive overflow bits forced out from said shift register as an m-th term, to divide the m-th term by a generator polynomial used for the CRC operation, and to output a first remainder as a first CRC arithmetic operation result;
   a second CRC arithmetic unit, operatively connected to receive the input bit train as a zero-th term, and to output a second CRC arithmetic operation result corresponding to the zero-th term plus a second remainder obtained by dividing a previous CRC arithmetic operation result obtained just before the the current CRC arithmetic operation result; and
   a subtraction unit, operatively connected to said first and second CRC arithmetic units and said synchronization control unit, to obtain a difference between the first CRC arithmetic operation result and the second CRC arithmetic operation result and to output the difference as the current CRC arithmetic operation result in a time series manner to said synchronization control unit.

3. A synchronization circuit as set forth in claim 1, wherein said continuous CRC arithmetic unit is comprised by:
   a single CRC arithmetic unit, operatively connected to receive overflow bits forced out from said shift register as an m-th term, to divide the m-th term by a generator polynomial used for the CRC operation and to output a first remainder as a first CRC arithmetic operation result, and operatively connected to receive the input bit train as a zero-th term and to output a second CRC arithmetic operation result corresponding to the zero-th term plus a second remainder obtained by dividing a previous CRC arithmetic operation result obtained just before the current CRC arithmetic operation result, a subtraction unit, operatively connected to said single CRC arithmetic unit and said synchronization control unit, to obtain a difference between the first CRC arithmetic operation result and the second CRC arithmetic operation result and to output the difference as the current CRC arithmetic operation result in a time series manner to said synchronization control unit and includes a CRC memory unit to hold a previous CRC arithmetic operation result produced just before the current CRC in the said CRC memory unit, and to output the previous CRC arithmetic operation result to the said single CRC arithmetic unit and said synchronization control unit.

4. A synchronization circuit as set forth in claim 3, wherein said single CRC arithmetic unit is comprised of:

a CRC memory unit, operatively connected to said single CRC arithmetic unit, to hold the previous CRC arithmetic operation result; and a read only memory to receive as an address input the overflow bits output by said shift register unit, the input bit train and the previous CRC arithmetic operation result obtained just before the current CRC arithmetic operation result and held in said CRC memory unit, and to read out the current CRC arithmetic operation result corresponding to the address input.

5. A synchronization circuit as set forth in claim 2, wherein said second CRC arithmetic unit is comprised of a CRC operator including a plurality of shift registers connected in series and providing a parallel output, including a final stage shift register, a plurality of EX-OR gates, each preceding one of said shift registers, including a first EX-OR gate receiving the input bit train, and a connector, connected to said EX-OR gates and the final stage shift register, to selectively provide connection therebetween in accordance with coefficients of orders of the generator polynomial, and wherein said first CRC arithmetic unit receives as input the delayed bit train output from said shift register unit and the parallel output from said shift registers in said CRC operator and obtains an exclusive OR of a remainder $R(\chi^m/G)$, where G is the generator polynomial and $\chi^m$ is the m-th term and $R(\chi^m/G)=\chi^m \bmod(G)$ and the parallel output of said shift registers, and loads the first CRC arithmetic operation result in said shift registers.

6. A synchronization circuit as set forth in claim 2, wherein said first CRC arithmetic unit is comprised of an output unit to output a remainder $R(\chi^m/G)$, where G is a generator polynomial and $\chi^m$ is the m-th term and $R(\chi^m/G)=\chi^m \bmod(G)$, said output unit receiving as input the overflow bits output from said shift register unit, and wherein said second CRC arithmetic unit is comprised of:

a plurality of shift registers connected in series, including a final stage shift register, a plurality of EX-OR gates, each preceding one of said shift registers, including a first EX-OR gate receiving the input bit train, and a connector to said EX-OR gates and the final stage shift register, to selectively provide connection therebetween in accordance with coefficients of orders of the generator polynomial.

7. A synchronization circuit as set forth in claim 1, wherein said shift register unit is comprised of a shift register m bits long, where m is an integer greater than 1 and represents a number of bits covered by the CRC operation, and wherein said continuous CRC arithmetic unit is comprised of:

a first CRC arithmetic unit, operatively connected to said shift register, to divide the delayed bit train by a generator polynomial used for the CRC operation and output a remainder obtained as a first CRC arithmetic operation result;

a second CRC arithmetic unit, operatively connected to receive the input bit train, to divide the input bit train by the generator polynomial and output a remainder obtained as a second CRC arithmetic operation result; and a subtraction unit, operatively connected to said first and second CRC arithmetic units and said synchronization control unit, to obtain a difference between the first CRC arithmetic operation result and the second CRC arithmetic operation result to produce the current CRC arithmetic operation result in a time series manner for said synchronization control unit.

8. A synchronization circuit as set forth in claim 7, wherein said subtraction unit is comprised of an EX-OR processing unit to perform an exclusive OR operation on the first and second CRC arithmetic operation results from said first and second CRC arithmetic units.

9. A synchronization circuit as set forth in claim 7, wherein said first CRC arithmetic unit is comprised of a first read only memory and a first CRC memory unit which holds an output of said first read only memory, said first read only memory receiving the output held by said first CRC memory unit and the delayed bit train output by said shift register unit as an address input and outputting the first CRC arithmetic operation result corresponding to the address input, and wherein said second CRC arithmetic unit is comprised of a second read only memory and a second CRC memory unit which holds an output of said second read only memory, said second read only memory receiving the output of said second CRC memory unit and said input bit train as an address input and outputting the second CRC arithmetic operation result corresponding to the address input.

10. A synchronization circuit as set forth in claim 7, wherein said continuous CRC arithmetic unit further comprises a single read only memory, wherein said first CRC arithmetic unit comprises:

delayed train means for supplying the delayed bit train to said single read only memory; and a first CRC memory unit, operatively connected to said single read only memory, to hold a first output of said single read only memory generated in dependence upon the delayed bit train and a previous first output of said single read only memory, and wherein said second CRC arithmetic unit comprises:

input train means for supplying the input bit train to said single read only memory; and a second CRC memory unit to hold a second output of said single read only memory produced in dependence upon the input bit train and a previous second output of said single read only memory.

11. A synchronization circuit as set forth in claim 8, wherein said first CRC arithmetic unit is comprised of:

a first CRC operator; and an output unit receiving as input the delayed bit train output from said shift register unit and outputs a remainder $R(\chi^m/G)$, where G is a generator polynomial and $\chi^m$ is the m-th term and $R(\chi^m/G) = \chi^m \mod(G)$, wherein said second CRC arithmetic unit is comprised of a second CRC operator receiving the bit train, wherein said EX-OR processing unit comprises an output unit to output a remainder $R(\chi^m/G)$, and wherein said first and second CRC operators, each comprises:

a plurality of serially connected shift registers, including a final stage shift register having an output;

EX-OR gates, each preceding one of said shift registers; and a connector connected to said EX-OR gates to selectively connect the output from the final stage shift register in dependence upon coefficients of orders of the generator polynomial.

12. A synchronization circuit as set forth in claim 1, wherein said shift register unit is comprised of a shift register m bits long, where m is an integer greater than 1 and represents a number of bits covered by the CRC operation, and wherein said continuous CRC arithmetic unit is comprised of:

a wired logic unit, operatively connected to receive as input m number of bit outputs from said shift register, to perform predetermined OR operations on the bit outputs and produce EX-OR outputs for a plurality of bit positions; and a remainder arithmetic unit having a plurality of input gates corresponding to the plurality of bit positions, to add the EX-OR outputs resulting in an equivalent operation as said CRC operation on the input bit train and to output the current CRC arithmetic operation result to said synchronization control unit.

13. A synchronization circuit as set forth in claim 12, wherein said remainder arithmetic unit is comprised of a parity check circuit.

14. A synchronization circuit as set forth in claim 1, wherein said shift register unit is comprised of a k-stage shift register having first and k-th stages, where k is an integer of at least 1 and less than a number of bits constituting headers of the ARM cells, and wherein said continuous CRC arithmetic unit is comprised of:

a remainder arithmetic unit, operatively connected to said synchronization control unit and said k-stage shift register to receive as input a first bit output from the first stage and a k-th bit output from the k-th stage of said k-stage shift register and a previous CRC arithmetic operation result obtained just before the current CRC arithmetic operation result and calculates the current CRC arithmetic operation result; and a delay unit operatively connected to receive the current CRC arithmetic operation result output from said remainder arithmetic unit and to provide the previous CRC arithmetic operation result to said remainder arithmetic unit.

15. A synchronization circuit as set forth in claim 14, wherein said delay unit is comprised of:

a D-flipflop operatively connected to said remainder arithmetic unit; and means for applying a timing clock to said k-stage shift register and said D-flipflop.

16. A synchronization circuit as set forth in claim 14, wherein said remainder arithmetic unit is comprised of:

a wired logic unit, including a first wire group operatively connected to receive the first-stage output and the k-th stage output of said k-stage shift register and the previous CRC arithmetic operation result output by said delay unit, and a second wire group, connected by a predetermined bit pattern to the first wire group;

EX-OR gates receiving inputs via the second wire group and producing the current CRC arithmetic operation result; and leading wires connected to supply the current CRC arithmetic operation result output by said EX-OR gates to said delay unit and said synchronization control unit.

17. A synchronization circuit as set forth in claim 1, wherein said synchronization control unit includes reset means for resetting internal states of said shift register unit and said continuous CRC arithmetic unit by generating a reset signal cyclically in synchronization with headers of the ATM cells.

18. A synchronization circuit as set forth in claim 17, wherein said synchronization control unit judges if the current CRC arithmetic operation result of the input bit train coincides with a desired value and generates a coincidence signal, wherein said reset means in said synchronization control unit comprises:

a hunt processing unit, operatively connected to said synchronization control unit, to generate a pseudosynchronization signal indicating pseudosynchronization has started in response to the coincidence signal;

a rear protection unit, operatively connected to said hunt processing unit, to begin rear protection confirmation after receiving the pseudosynchronization signal and to generate a synchronization start signal when rear protection is confirmed; and a front protection unit, operatively connected to said rear protection unit, said shift register unit, said continuous CRC arithmetic unit and said hunt processing unit, to generate the synchronization detection signal and the reset signal.

19. A synchronization circuit as set forth in claim 17, wherein said shift register unit is comprised of a k-stage shift register having first and k-th stages, where k is an integer of at least 1 and less than a number of bits constituting headers of the ATM cells, wherein said continuous CRC arithmetic unit is comprised of:

a remainder arithmetic unit, operatively connected to said synchronization control unit and to said k-stage shift register to receive as input a first bit output from the first stage and a k-th bit output from the k-th stage of said k-stage shift register and a previous CRC arithmetic operation result obtained just before the current CRC arithmetic operation result and calculates the current CRC arithmetic operation result; and a delay unit, comprising a D-flipflop having a clock input and operatively connected to receive the current CRC arithmetic operation result output from said remainder arithmetic unit and to provide the previous CRC arithmetic operation result to said remainder arithmetic unit, and wherein said reset means is comprised of an AND gate, operatively connected to receive at one input a reception signal and at another input a header count indicating a number of arrivals of headers of the ATM cells, having an output operatively connected to the k-th stage of said k-stage shift register and the clock input of said D-flipflop, the reception signal rising along with reception of the input bit train and falling when the reception ends.

20. A synchronization circuit as set forth in claim 1, wherein said synchronization control unit is provided with header error correction means for correcting a bit error of a header in one of the ATM cells, said header error correction means being comprised of a portion for cyclically replacing predetermined amounts of bits in the input bit train, a portion for performing a logical operation while shifting bits successively to produce error correction information, and a bit correction portion for correcting one-bit errors in accordance with the error correction information.

21. A synchronization circuit as set forth in claim 1, wherein said continuous CRC arithmetic unit is provided with logic inversion means for inverting a predetermined plurality of bits in the current CRC arithmetic operation result, corresponding to "1" bits in an offset bit train mapped in an HEC region in a header in the ATM cells during transmission.

* * * * *

UNITED STATES PATENT AND TRADEMARK OFFICE
CERTIFICATE OF CORRECTION

PATENT NO. : 5,282,215

DATED : January 25, 1994

INVENTOR(S) : Hyodo et al.

It is certified that error appears in the above-indentified patent and that said Letters Patent is hereby corrected as shown below:

Col. 5, line 2, "m0$\alpha_1$-$\alpha_2$" should be --m-$\alpha_1$-$\alpha_2$--.

Col. 6, line 35, "signal S" should be --signal $S_e$--.

Col. 9, line 3, "input)" should be --(input)--;

line 31, "the a" should be --the $a_n$--.

Col. 10, line 41, before "equation" insert --The--.

Col. 11, line 43, "R[$\chi^n$:" should be --R[$\chi^n$--;

line 66, "when a" should be --when $a_n$--;

line 68, "$\chi$" should be --$\chi^i$--;

Col. 15, line 37, after "is:" insert NEW PARAGRAPH --10011011-- (as in line 29 above); start "From the term... at the left margin (as in line 31 above); "$\chi^{28}$" should be --$S^{38}$--;

line 42, ")," should be --).--.

Col. 16, line 17, delete "by eight";

line 18, "factors:" should be --as:--;

line 60, "forth" should be --for--.

Col. 17, line 2, "is" should be --are--.

Col. 18, line 12, "$\psi^7$" should be --$\chi^7$--;

line 15, "$\chi^7$" should be --$\chi^{41}$--.

UNITED STATES PATENT AND TRADEMARK OFFICE
CERTIFICATE OF CORRECTION

PATENT NO. : 5,282,215
DATED : January 25, 1994
INVENTOR(S) : Hyodo et al.

It is certified that error appears in the above-indentified patent and that said Letters Patent is hereby corrected as shown below:

Col. 19, line 32, "from a" should be --from $a_n$,--;

line 39, "unit" should be --unit 71.--;

line 41, "data a" should be --data $a_1$--.

Col. 20, line 4, "are" should be --$a_{40}$--;

between lines 34 and 35, insert --(v) When $n \geq 2$

The data $a_{n+39}$ is input to the LSB of the shift register 21 and the ROM 35. At this time, in the shift register, the data is shifted in the direction from the LSB to the MSB (right direction in the figure). Further, at this time, simultaneously the CRC arithmetic operation result of the state just before (initial state) from the CRC memory unit 36 and, further, the $a_{n-1}$ from the MSB of the shift register are input. In this state, the next CRC arithmetic operation result is read from the ROM 35 and is set in the CRC memory unit 36.

Data of the number of bits sufficient for performing the desired CRC arithmetic operation is input to the CRC arithmetic processing unit 71, so the synchronization control unit 23 waits unit the desired CRC arithmetic operation results become synchronized.--.

UNITED STATES PATENT AND TRADEMARK OFFICE
CERTIFICATE OF CORRECTION

PATENT NO. : 5,282,215

DATED : January 25, 1994

INVENTOR(S) : Hyodo et al.

It is certified that error appears in the above-indentified patent and that said Letters Patent is hereby corrected as shown below:

Col. 22, between lines 6 and 7, start a NEW paragraph and insert --$\psi_{i0}$ $\psi_{i1}$ $\psi_{i2}$ $\psi_{i3}$ $\psi_{i4}$ $\psi_{i5}$ $\psi_{i6}$ $\psi_{i7}$--;

line 19, "32)" should be --39)--;

line 35, "77" should be --$<7$--.

line 49, after "becomes" start a NEW paragraph, after "127" delete "." and start a NEW paragraph with "Therefore,.."

line 54, "+E)" should be --+E)'--.

Col. 23, line 10, "$\chi^{(i+3)mod(127)}$ should be --$\chi^{(i+e)mod(127)}$--  (37).

line 45, after "octet" insert --to fifth octet--;

line 46, "ARM" should be --ATM--.

Col. 24, line 10, "S-1" should be --$S_{-1}$--;

line 24, "Will" should be --will--;

line 63, "R" should be --$R_c$--.

UNITED STATES PATENT AND TRADEMARK OFFICE
CERTIFICATE OF CORRECTION

PATENT NO. : 5,282,215

DATED : January 25, 1994

INVENTOR(S) : Hyodo et al.

It is certified that error appears in the above-indentified patent and that said Letters Patent is hereby corrected as shown below:

Col. 25, lines 13, 17, 19, 20 and 24 "$=S_{10} \cap S_{11} \cap S_{12} \cap S_{13} \cap S_{14} \cap S_{15} \cap S_{16} \cap S_{17}$" should be -- $=\overline{S}_{10} \cap \overline{S}_{11} \cap \overline{S}_{12} \cap \overline{S}_{13} \cap \overline{S}_{14} \cap \overline{S}_{15} \cap \overline{S}_{16} \cap \overline{S}_{17}$ --;

line 17, "$S_i$" should be --$\overline{S}_i$--;

line 57, "passing" should be --passed--.

Co. 26, line 1, after "train." start a NEW paragraph with "As";

line 32, "ARM" should be --ATM--.

Col. 27, line 38, "including" should be --including - --;

Col. 28, line 4, after "connector" insert --connected--.

Col. 29, line 58, "ARM" should be --ATM--.

Col. 30, line 16, "including" should be --including - --.

Signed and Sealed this

Eleventh Day of October, 1994

Attest:

BRUCE LEHMAN

*Attesting Officer*　　　*Commissioner of Patents and Trademarks*

UNITED STATES PATENT AND TRADEMARK OFFICE
CERTIFICATE OF CORRECTION

PATENT NO.:     5,282,215
DATED      :    January 25, 1994
INVENTOR(S):    Ryuji HYODO et al.

It is certified that errors appear in the above-identified patent and that said Letters Patent is hereby corrected as shown below:

Col. 22, line 35, replace with --    $0 \leq e \leq 7$--.

Col. 23, line 10, replace with --    $S' - \chi^{(i+e) \bmod (127)}$          (37)--

Signed and Sealed this

Sixth Day of February, 2001

Attest:

Q. TODD DICKINSON

Attesting Officer          Director of Patents and Trademarks